US011248582B2

(12) United States Patent
Tobin et al.

(10) Patent No.: US 11,248,582 B2
(45) Date of Patent: *Feb. 15, 2022

(54) MULTIPLE MATERIAL COMBINATIONS FOR PRINTED REINFORCEMENT STRUCTURES OF ROTOR BLADES

(71) Applicant: General Electric Company, Schenectady, NY (US)

(72) Inventors: James Robert Tobin, Simpsonville, SC (US); Stephen Bertram Johnson, New Castle, NH (US); Todd Alan Anderson, Niskayuna, NY (US); Krishnan Balaji Parthasarathy Thattai, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 477 days.

This patent is subject to a terminal disclaimer.

(21) Appl. No.: 15/818,842

(22) Filed: Nov. 21, 2017

(65) Prior Publication Data

US 2019/0153993 A1 May 23, 2019

(51) Int. Cl.
*B29C 70/38* (2006.01)
*F03D 1/06* (2006.01)
(Continued)

(52) U.S. Cl.
CPC .......... *F03D 1/0675* (2013.01); *B29C 70/023* (2013.01); *B29C 70/54* (2013.01);
(Continued)

(58) Field of Classification Search
CPC ... B29C 70/382; B29C 70/384; B29C 70/368; B29C 70/388; B29C 70/386
See application file for complete search history.

(56) References Cited

U.S. PATENT DOCUMENTS

| RE19,412 E | 1/1935 | Zaparka |
|---|---|---|
| 2,450,440 A | 10/1948 | Mills |

(Continued)

FOREIGN PATENT DOCUMENTS

| CN | 101906251 A | 12/2010 |
|---|---|---|
| CN | 103358564 A | 10/2013 |

(Continued)

OTHER PUBLICATIONS

Karch, Matthias, Design and Manufacturing of Hierarchical Multi-Functional Materials Via High Resolution Additive Manufacturing, Master's Thesis, Technische Universtat Darmstadt (2017), 65 pages. (Year: 2017).*

(Continued)

*Primary Examiner* — Matthew J Daniels
(74) *Attorney, Agent, or Firm* — Dority & Manning, P.A.

(57) ABSTRACT

Rotor blade panels, along with methods of their formation, are provided. The rotor blade panel may include one or more fiber-reinforced outer skins having an inner surface; and, a plurality of reinforcement structures on the inner surface of the one or more fiber-reinforced outer skins, where the reinforcement structure bonds to the one or more fiber-reinforced outer skins as the reinforcement structure is being deposited. The reinforcement structure includes, at least, a first composition and a second composition, with the first composition being different than the second composition.

7 Claims, 18 Drawing Sheets

(51) Int. Cl.
  *B29C 70/02* (2006.01)
  *B29D 99/00* (2010.01)
  *B29C 70/54* (2006.01)
  *B29L 31/08* (2006.01)
  *B29K 101/12* (2006.01)

(52) U.S. Cl.
  CPC ..... *B29D 99/0014* (2013.01); *B29D 99/0028* (2013.01); *B29K 2101/12* (2013.01); *B29L 2031/085* (2013.01); *F05B 2230/50* (2013.01); *F05B 2240/221* (2013.01); *F05B 2240/30* (2013.01); *F05B 2280/6003* (2013.01); *F05B 2280/6012* (2013.01)

(56) References Cited

U.S. PATENT DOCUMENTS

| | | | |
|---|---|---|---|
| 2,451,131 A | 10/1948 | Vidal | |
| 2,503,450 A | 4/1950 | Nebesar | |
| 3,000,446 A | 9/1961 | Warnken | |
| 3,093,219 A | 6/1963 | Ramme | |
| 3,137,887 A | 6/1964 | Mannino et al. | |
| 3,321,019 A | 5/1967 | Dmitroff et al. | |
| 3,528,753 A | 9/1970 | Dutton et al. | |
| 3,586,460 A | 6/1971 | Toner | |
| 3,956,564 A * | 5/1976 | Hillig | B29C 70/20 428/366 |
| 4,319,872 A | 3/1982 | Lupke | |
| 4,329,119 A | 5/1982 | Baskin | |
| 4,474,536 A | 10/1984 | Gougeon et al. | |
| 4,626,172 A | 12/1986 | Mouille et al. | |
| 4,718,844 A | 1/1988 | Dickhut | |
| 5,059,109 A | 10/1991 | Dickhut | |
| 5,088,665 A | 2/1992 | Vijgen et al. | |
| 5,346,367 A | 9/1994 | Doolin et al. | |
| 6,264,877 B1 | 7/2001 | Pallu De La Barriere | |
| 6,890,152 B1 | 5/2005 | Thisted | |
| 7,059,833 B2 | 6/2006 | Stiesdal et al. | |
| 7,364,407 B2 | 4/2008 | Grabau | |
| 7,458,777 B2 | 12/2008 | Herr | |
| 7,637,721 B2 | 12/2009 | Driver et al. | |
| 7,976,275 B2 | 7/2011 | Miebach et al. | |
| 7,988,421 B2 | 8/2011 | Bakhuis et al. | |
| 8,007,624 B2 | 8/2011 | Stiesdal | |
| 8,062,728 B2 | 11/2011 | De Beats | |
| 8,083,488 B2 | 12/2011 | Fritz | |
| 8,092,187 B2 | 1/2012 | Bell | |
| 8,162,590 B2 | 4/2012 | Haag | |
| 8,273,806 B2 | 9/2012 | Guadagno et al. | |
| 8,317,479 B2 | 11/2012 | Vronsky et al. | |
| 8,376,450 B1 | 2/2013 | Long et al. | |
| 8,540,491 B2 | 9/2013 | Gruhn | |
| 8,602,761 B2 | 12/2013 | Arrizabalaga | |
| 8,657,581 B2 | 2/2014 | Pilpel et al. | |
| 8,673,106 B1 | 3/2014 | Jolley et al. | |
| 8,678,746 B2 | 3/2014 | Haag | |
| 8,708,691 B2 | 4/2014 | Matsen et al. | |
| 8,747,098 B1 | 6/2014 | Johnson et al. | |
| 8,865,798 B2 | 10/2014 | Merle et al. | |
| 8,877,116 B2 | 11/2014 | Grabau | |
| 8,932,024 B2 | 1/2015 | Hayashi et al. | |
| 8,961,142 B2 | 2/2015 | Wansink | |
| 8,992,813 B2 | 3/2015 | Robbins et al. | |
| 9,090,027 B2 | 7/2015 | Sutton | |
| 9,150,721 B2 | 10/2015 | Bateman et al. | |
| 9,377,005 B2 | 6/2016 | Yarbrough et al. | |
| 9,434,142 B2 | 9/2016 | Levit | |
| 9,458,821 B2 | 10/2016 | Jacobsen et al. | |
| 9,512,818 B2 | 12/2016 | Richtman | |
| 9,719,489 B2 | 8/2017 | Stewart | |
| 10,240,576 B2 | 3/2019 | Drack et al. | |
| 10,273,935 B2 | 4/2019 | Albert | |
| 2004/0253114 A1 | 12/2004 | Gunneskov et al. | |
| 2007/0065290 A1 | 3/2007 | Herr | |
| 2007/0077150 A1 | 4/2007 | Llorente Gonzalez | |
| 2007/0107189 A1* | 5/2007 | Prichard | B64C 3/26 29/448 |
| 2007/0189903 A1 | 8/2007 | Eyb | |
| 2009/0068017 A1 | 3/2009 | Rudling | |
| 2009/0074585 A1 | 3/2009 | Koegler et al. | |
| 2009/0140527 A1 | 6/2009 | Pawar | |
| 2009/0148300 A1 | 6/2009 | Driver et al. | |
| 2009/0155084 A1 | 6/2009 | Livingston et al. | |
| 2009/0301648 A1 | 12/2009 | Hogg | |
| 2010/0047070 A1 | 2/2010 | Slot | |
| 2010/0121475 A1 | 5/2010 | Lyons | |
| 2010/0135806 A1 | 6/2010 | Benito | |
| 2010/0135815 A1 | 6/2010 | Bagepalli | |
| 2010/0296940 A1 | 11/2010 | Zuteck | |
| 2010/0296941 A1 | 11/2010 | Zuteck | |
| 2011/0018282 A1 | 1/2011 | Hayashi et al. | |
| 2011/0076149 A1 | 3/2011 | Santiago et al. | |
| 2011/0097211 A1 | 4/2011 | Rudling | |
| 2011/0097326 A1 | 4/2011 | Luehrsen | |
| 2011/0100540 A1 | 5/2011 | Matthew | |
| 2011/0103965 A1 | 5/2011 | Matthew | |
| 2011/0135467 A1 | 6/2011 | Saddoughi et al. | |
| 2011/0142635 A1 | 6/2011 | Frizt | |
| 2011/0142667 A1 | 6/2011 | Miebach et al. | |
| 2011/0142668 A1 | 6/2011 | Rao | |
| 2011/0142670 A1 | 6/2011 | Pilpel | |
| 2011/0176928 A1 | 7/2011 | Jensen | |
| 2011/0200444 A1 | 8/2011 | Garcia | |
| 2011/0223028 A1 | 9/2011 | Stege et al. | |
| 2011/0243736 A1 | 10/2011 | Bell | |
| 2011/0243750 A1 | 10/2011 | Gruhn | |
| 2011/0266721 A1 | 11/2011 | Song et al. | |
| 2011/0268558 A1 | 11/2011 | Driver | |
| 2011/0286853 A1 | 11/2011 | Kristensen | |
| 2012/0009069 A1 | 1/2012 | Grove-Nielsen | |
| 2012/0027590 A1 | 2/2012 | Bonnet | |
| 2012/0027610 A1 | 2/2012 | Yarbrough | |
| 2012/0027612 A1 | 2/2012 | Yarbrough | |
| 2012/0027613 A1 | 2/2012 | Yarbrough | |
| 2012/0121430 A1 | 5/2012 | Olsen et al. | |
| 2012/0128810 A1 | 5/2012 | Arriola Arrizabalaga et al. | |
| 2012/0134848 A1 | 5/2012 | Ramirez Jimenez et al. | |
| 2012/0138218 A1 | 6/2012 | Dean et al. | |
| 2012/0183408 A1 | 7/2012 | Noerlem | |
| 2012/0186730 A1 | 7/2012 | Shindo | |
| 2012/0263913 A1 | 10/2012 | Karem | |
| 2013/0108455 A1 | 5/2013 | Quiring et al. | |
| 2013/0164133 A1 | 6/2013 | Grove-Nielsen | |
| 2013/0186558 A1 | 7/2013 | Comb | |
| 2013/0241117 A1 | 9/2013 | Lind | |
| 2014/0072715 A1 | 3/2014 | Jones et al. | |
| 2014/0178204 A1 | 6/2014 | Livingston et al. | |
| 2014/0186175 A1 | 7/2014 | Baehmann et al. | |
| 2014/0205454 A1 | 7/2014 | Giovannetti et al. | |
| 2014/0295187 A1 | 10/2014 | Jacobsen | |
| 2014/0322023 A1 | 10/2014 | Tapia | |
| 2014/0328692 A1 | 11/2014 | Riddell et al. | |
| 2014/0334930 A1 | 11/2014 | Rob | |
| 2015/0224759 A1 | 8/2015 | Boon | |
| 2015/0247487 A1 | 9/2015 | Oerlemans et al. | |
| 2015/0308404 A1 | 10/2015 | Dahl | |
| 2015/0316028 A1 | 11/2015 | Breckenfeld | |
| 2015/0322920 A1 | 11/2015 | Jones | |
| 2016/0023433 A1 | 1/2016 | Langone | |
| 2016/0052173 A1 | 2/2016 | Hunter | |
| 2016/0107397 A1 | 4/2016 | Schibsbye | |
| 2016/0146019 A1 | 5/2016 | Pizano et al. | |
| 2016/0168997 A1 | 6/2016 | Garm | |
| 2016/0263844 A1 | 9/2016 | Smith | |
| 2016/0297146 A1 | 10/2016 | Wu | |
| 2016/0319801 A1 | 11/2016 | Smith | |
| 2016/0327019 A1 | 11/2016 | Tobin et al. | |
| 2016/0327020 A1 | 11/2016 | Tobin et al. | |
| 2016/0327021 A1 | 11/2016 | Tobin et al. | |
| 2016/0354984 A1 | 12/2016 | Hedges | |
| 2016/0377050 A1 | 12/2016 | Caruso et al. | |
| 2016/0377051 A1 | 12/2016 | Caruso et al. | |
| 2016/0377052 A1 | 12/2016 | Caruso et al. | |
| 2017/0015066 A1 | 1/2017 | Herrmann | |

(56) References Cited

U.S. PATENT DOCUMENTS

| | | |
|---|---|---|
| 2017/0021575 A1 | 1/2017 | Hansen et al. |
| 2017/0022821 A1 | 1/2017 | Ferber |
| 2017/0030330 A1 | 2/2017 | Caruso |
| 2017/0050372 A1 | 2/2017 | Nielsen et al. |
| 2017/0051718 A1 | 2/2017 | Klitgaard |
| 2017/0057158 A1 | 3/2017 | Caruso et al. |
| 2017/0058862 A1 | 3/2017 | Caruso et al. |
| 2017/0058865 A1 | 3/2017 | Caruso et al. |
| 2017/0058866 A1 | 3/2017 | Caruso |
| 2017/0074236 A1 | 3/2017 | Hynum et al. |
| 2017/0074237 A1 | 3/2017 | Caruso et al. |
| 2017/0074238 A1 | 3/2017 | Tobin et al. |
| 2017/0074240 A1 | 3/2017 | Caruso et al. |
| 2017/0082087 A1 | 3/2017 | Yarbrough |
| 2017/0082088 A1 | 3/2017 | Yarbrough et al. |
| 2017/0100902 A1 | 4/2017 | Asmatulu et al. |
| 2017/0113265 A1 | 4/2017 | Slavens et al. |
| 2017/0122287 A1 | 5/2017 | Dobbe et al. |
| 2017/0145990 A1 | 5/2017 | Drack et al. |
| 2017/0175534 A1 | 6/2017 | Ferber |
| 2017/0204833 A1 | 7/2017 | Albert et al. |
| 2017/0225362 A1 | 8/2017 | Anthony et al. |
| 2017/0252966 A1 | 9/2017 | Susnjara |
| 2017/0306766 A1 | 10/2017 | Munzer |
| 2018/0135602 A1 | 5/2018 | Tobin et al. |
| 2018/0156190 A1 | 6/2018 | Johnson |
| 2018/0216601 A1 | 8/2018 | Yarbrough |
| 2018/0223794 A1 | 8/2018 | Tobin et al. |
| 2018/0229452 A1 | 8/2018 | Ogale |
| 2018/0264749 A1 | 9/2018 | Albert |
| 2018/0283349 A1 | 10/2018 | Wardropper |
| 2018/0311927 A1 | 11/2018 | Tyan |
| 2019/0001589 A1 | 1/2019 | Salimi |
| 2019/0032491 A1 | 1/2019 | Nissen et al. |
| 2019/0084239 A1 | 3/2019 | Carlson |
| 2019/0153994 A1 | 5/2019 | Tobin |
| 2019/0178227 A1 | 6/2019 | Hawkins |
| 2019/0195191 A1 | 6/2019 | Girolamo |
| 2019/0291861 A1 | 9/2019 | McIntyre et al. |
| 2019/0293049 A1 | 9/2019 | Roberts |

FOREIGN PATENT DOCUMENTS

| | | |
|---|---|---|
| CN | 103703217 | 4/2014 |
| CN | 204488065 U | 7/2015 |
| CN | 104955278 A | 9/2015 |
| CN | 107187020 A | 9/2018 |
| EP | 0435446 A2 | 7/1991 |
| EP | 2204577 A2 | 7/2010 |
| EP | 2653717 A1 | 10/2013 |
| EP | 3037655 A1 | 6/2016 |
| EP | 3138697 A1 | 8/2017 |
| ES | 2371893 | 11/2012 |
| JP | H07102609 B2 | 11/1995 |
| JP | 2000 317972 A | 11/2000 |
| JP | 2007/009926 A | 1/2007 |
| JP | 2007/092716 A | 4/2007 |
| JP | 2012 158151 A | 8/2012 |
| JP | 2016 032929 A | 3/2016 |
| KR | 101 520 898 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO2015/015202 A1 | 2/2015 |
| WO | WO2016/134478 A1 | 9/2016 |
| WO | WO2017/092764 A | 6/2017 |
| WO | WO2017/092766 A1 | 6/2017 |
| WO | WO2018/015250 A1 | 1/2018 |

OTHER PUBLICATIONS

U.S. Appl. No. 15/424,055, filed Feb. 3, 2017.
U.S. Appl. No. 15/424,084, filed Feb. 3, 2017.
CGTech VERICUT, Automated Fibre Placement—wind blade: VERICUT Composite CNC simulation, Sep. 16, 2015, YouTube, retrieved from the Internet on Sep. 28, 2019, URL: https://youtu.be/xFNtTE82DiU (Year: 2015).
Thamizhisai Periyaswamy, Karthikeyan Balasubramanian, Christopher Pastore, "Novel characterization method for fibrous materials using non-contact acoustics: Material properties revealed by ultrasonic perturbations", Sep. 16, 2014, Elsevier, Ultrasonics 56, 261-369 (Year: 2014).
Zhai, Yuwei et. al., Additive Manufacturing: Making Imagination the Major Limitation, Journal of Metals, vol. 66, No. 5, Springer, NY, Mar. 11, 2014. pp. 808-816.
Patlolla, New progress in self-healing technology of composite wind turbine blades, Department of Mechanical Engineering, Wichita State Univeristy, https://soar.wichita.edu/handle/10057/5493, Feb. 16, 2012, (Abstract Only).
Matt, Development of Novel Self-Healing Polymer Composites for Use in Wind Turbine Blades http://energyresources.asmedigitalcollection.asme.org/article.aspx?articleid=2174064, The American Society of Mechanical Engineers, Journal of Energy Resources Technology, vol. 137, Issue 5, Sep. 1, 2015 (Abstract Only).
Teuwen et al., Vacuum Infused Thermoplastic Composites for Wind Turbine Blades, 2008 Wind Turbine Blade Workshop—Sandia National Laboratories, Jun. 3, 2008, 22 pages.
European Search Report for EP Application No. 18881968.4, dated Jul. 5, 2021.

\* cited by examiner

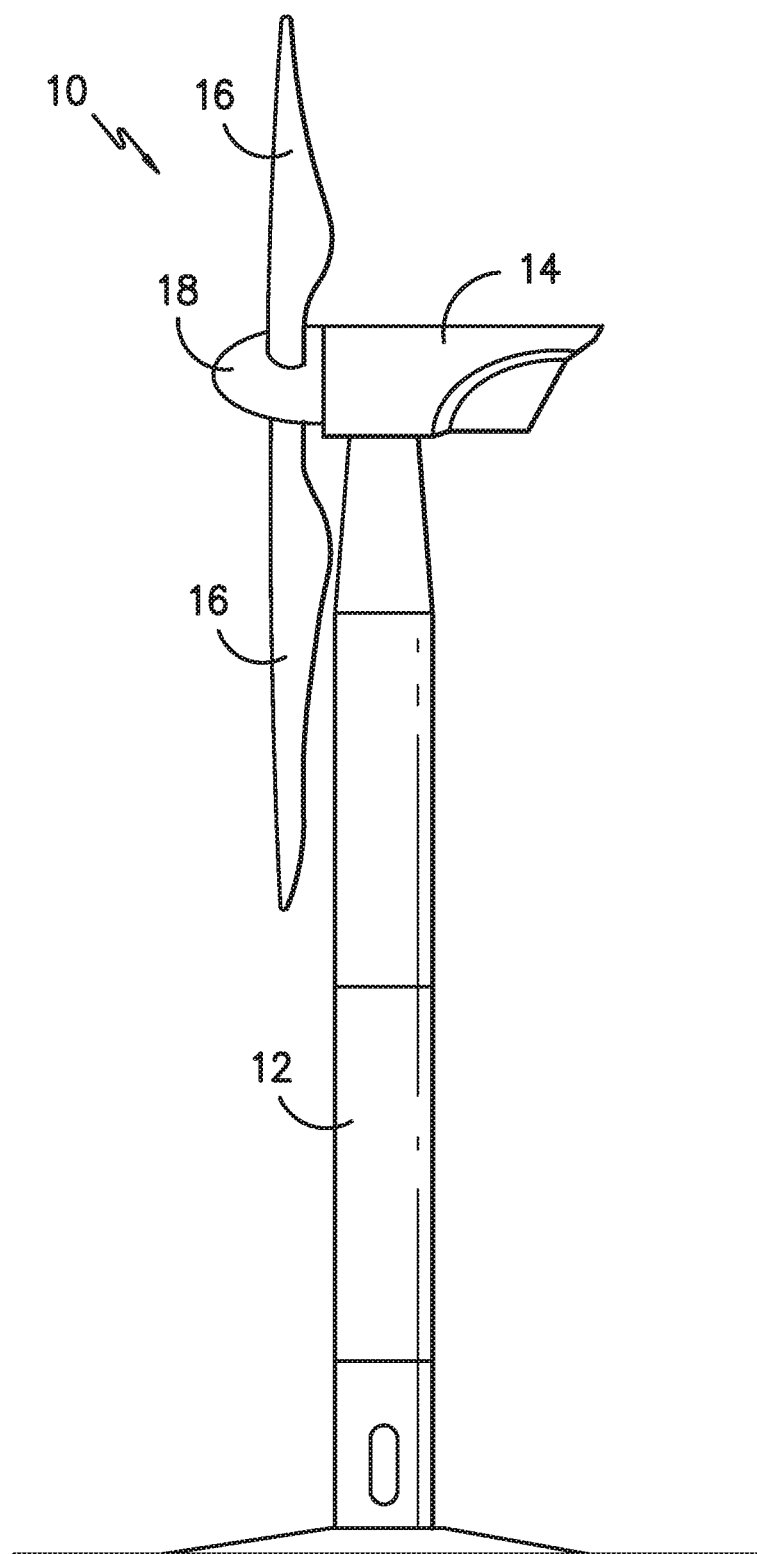
FIG. -1-

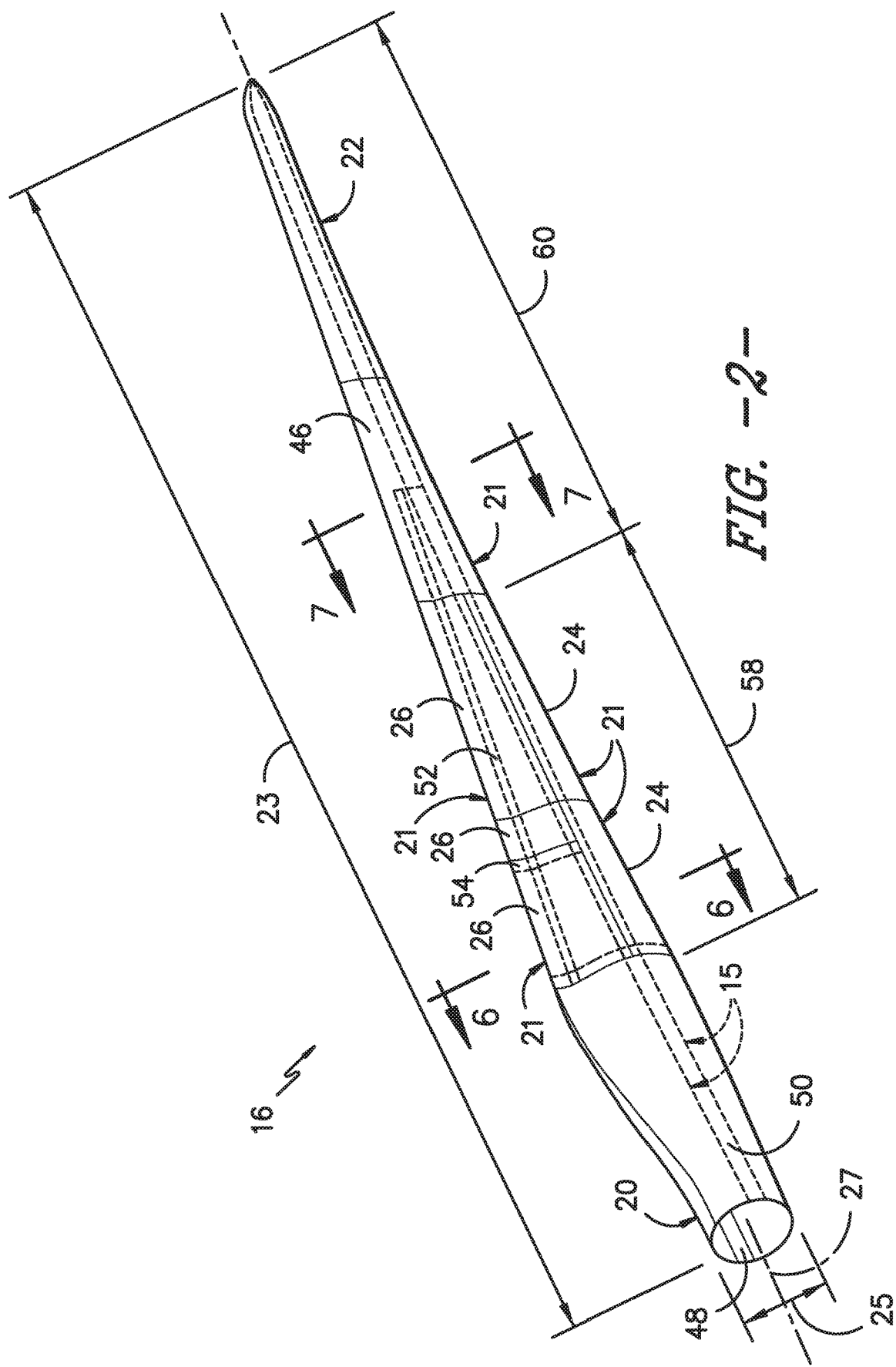
FIG. -2-

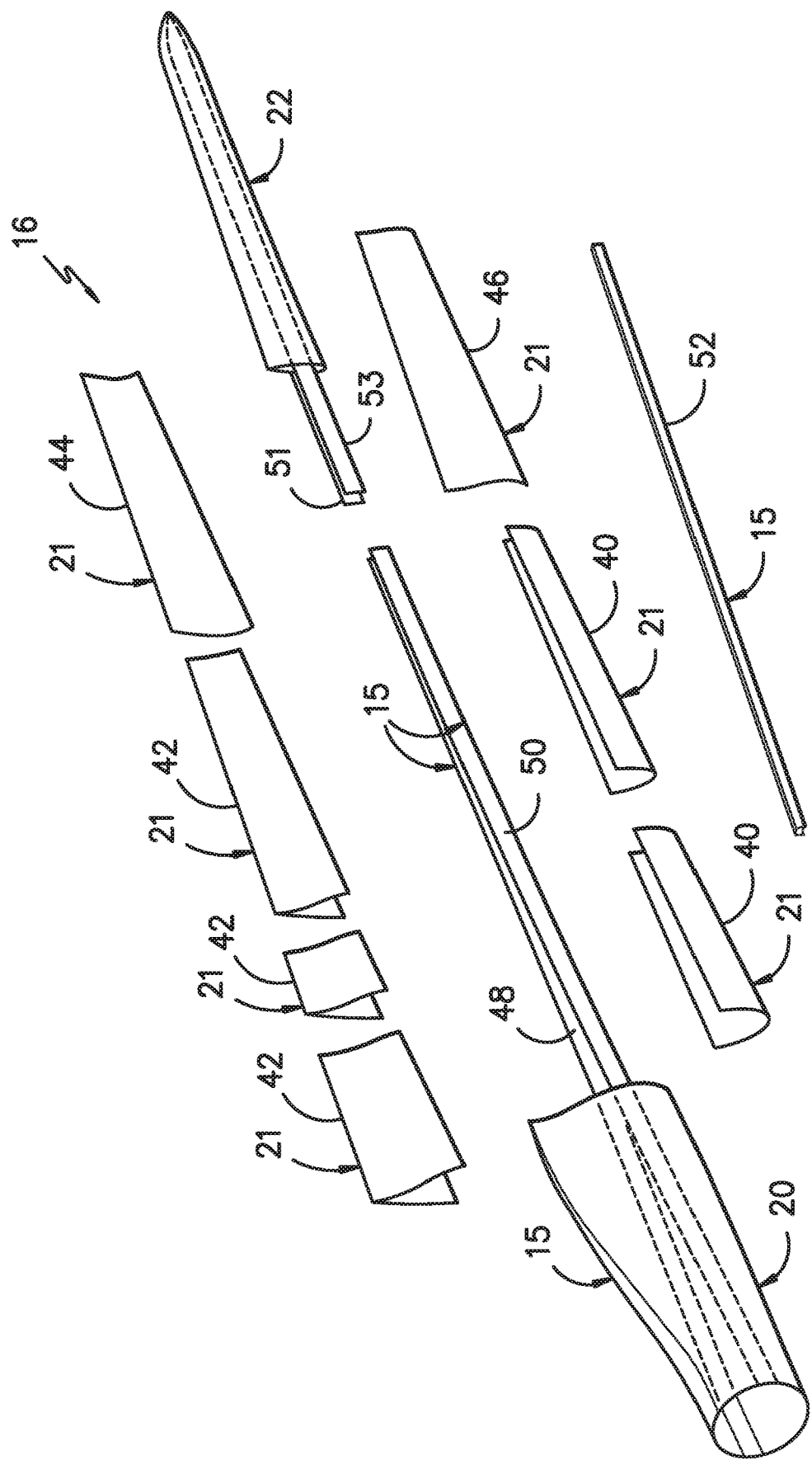
FIG. -3-

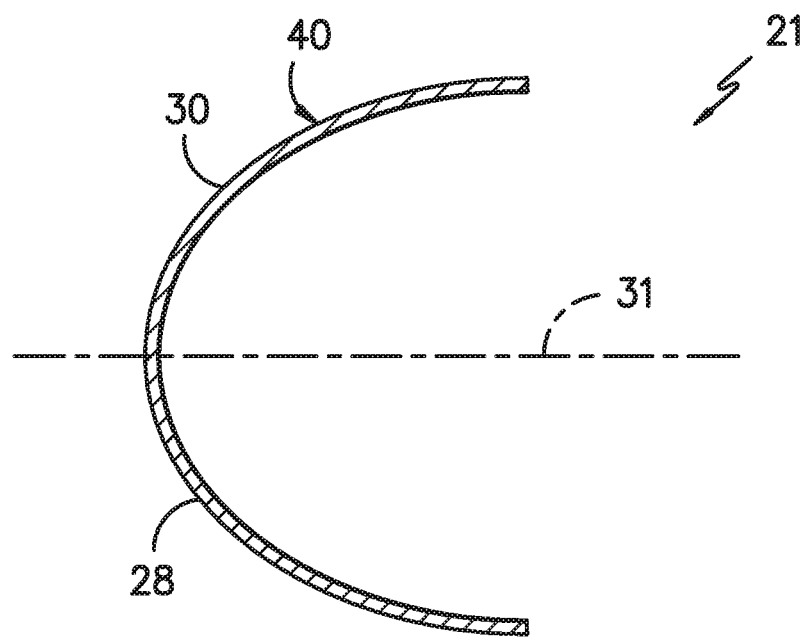
FIG. -4-
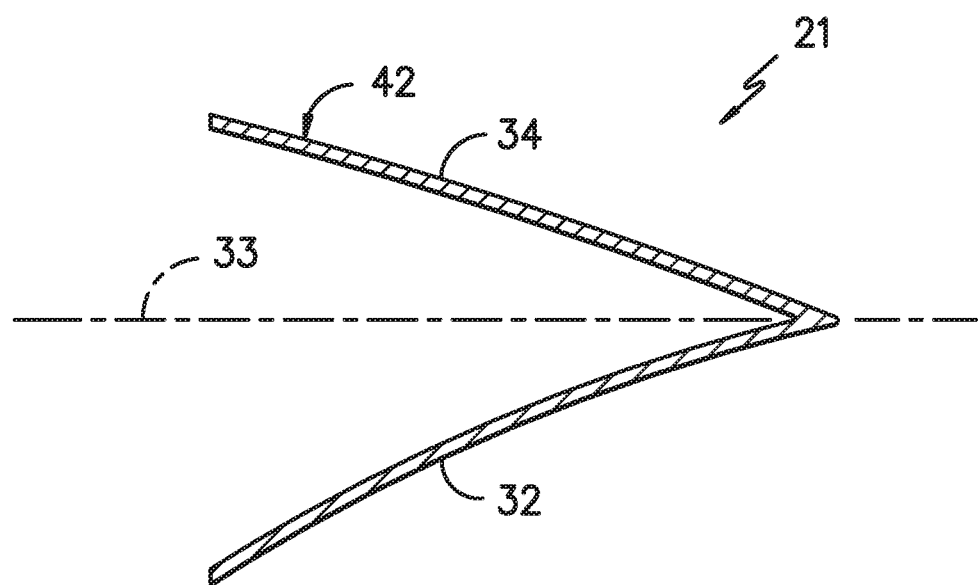
FIG. -5-

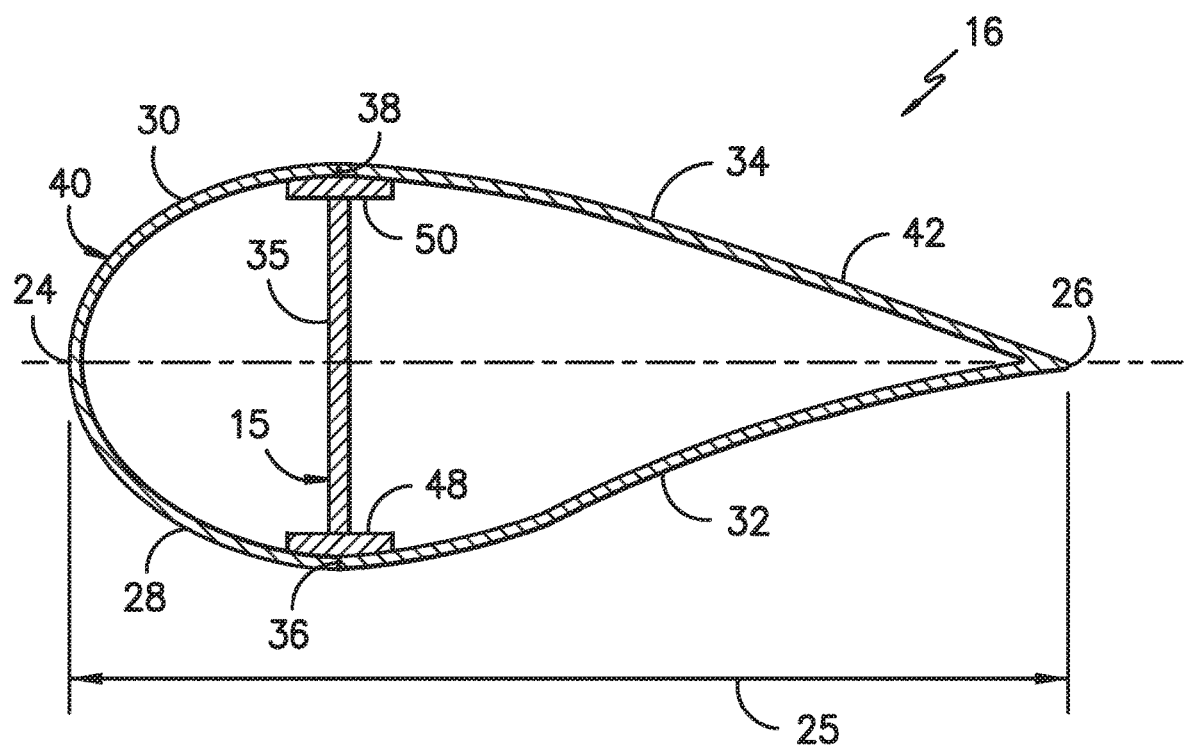
FIG. -6-
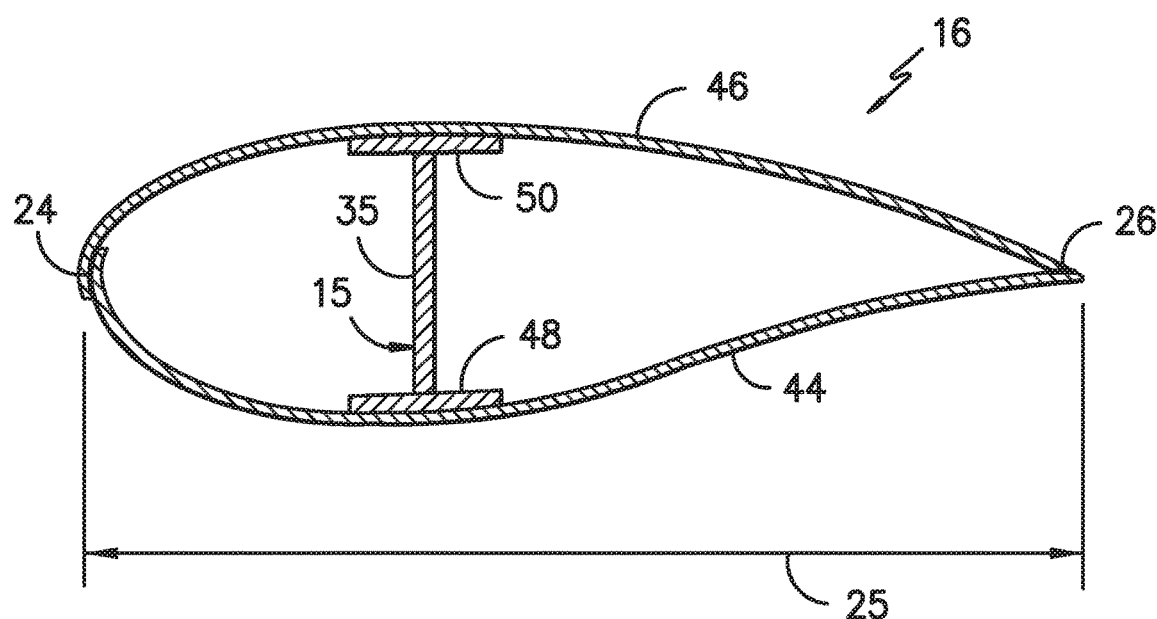
FIG. -7-

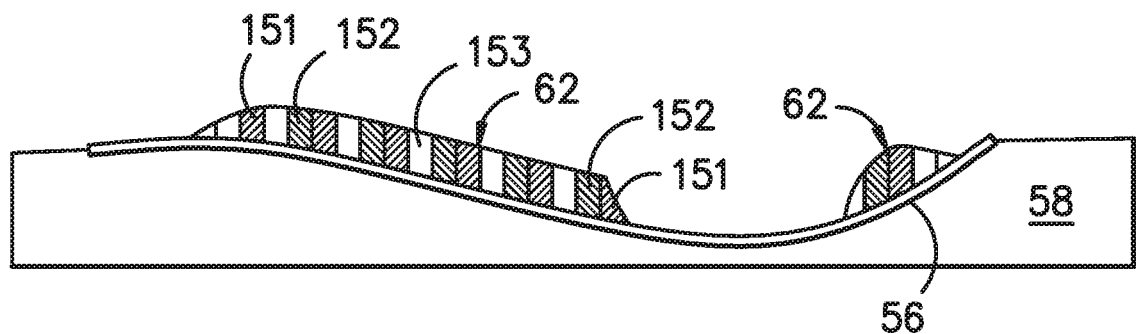
FIG. -8-
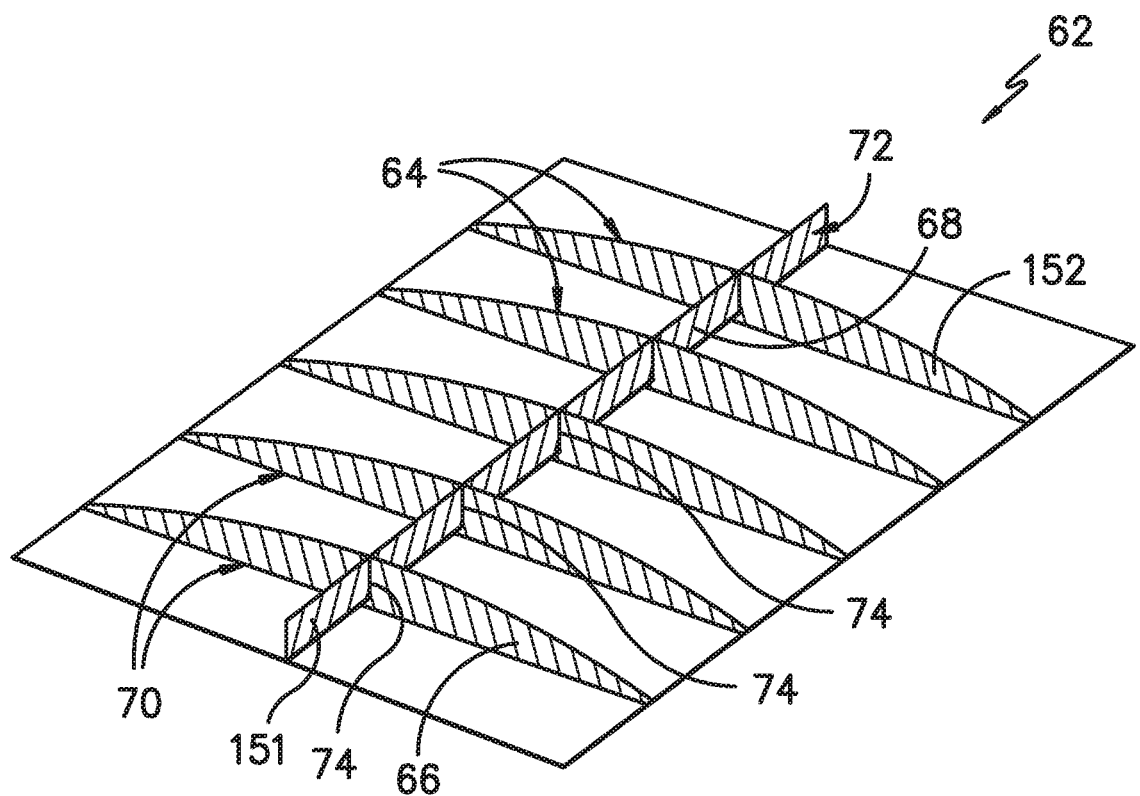
FIG. -9-

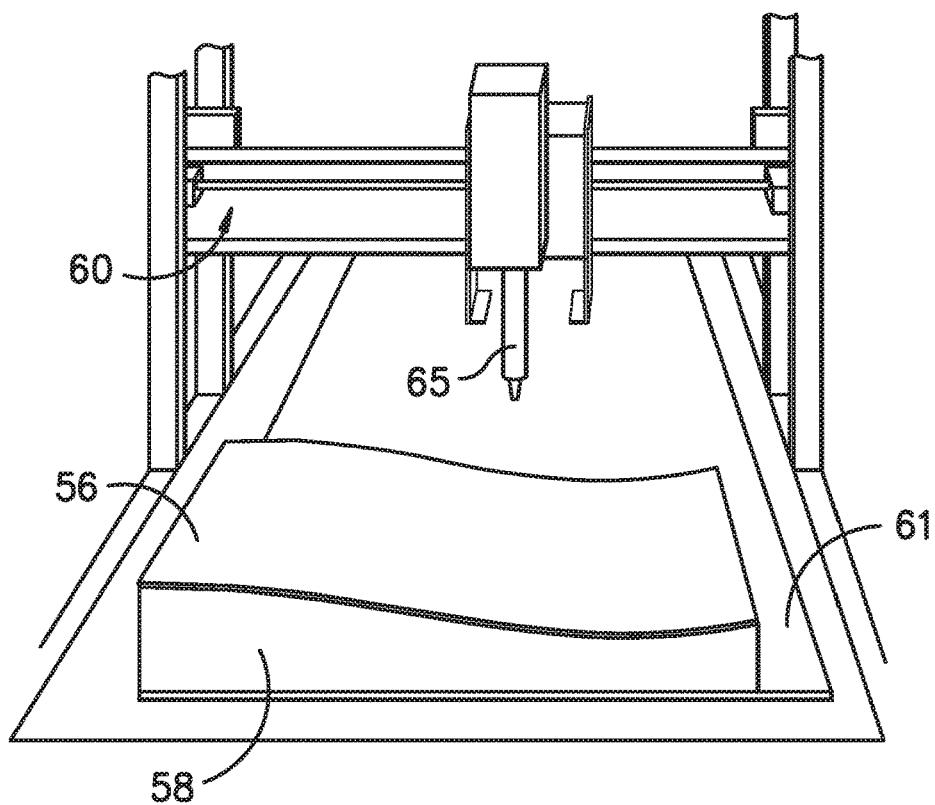
FIG. -10-
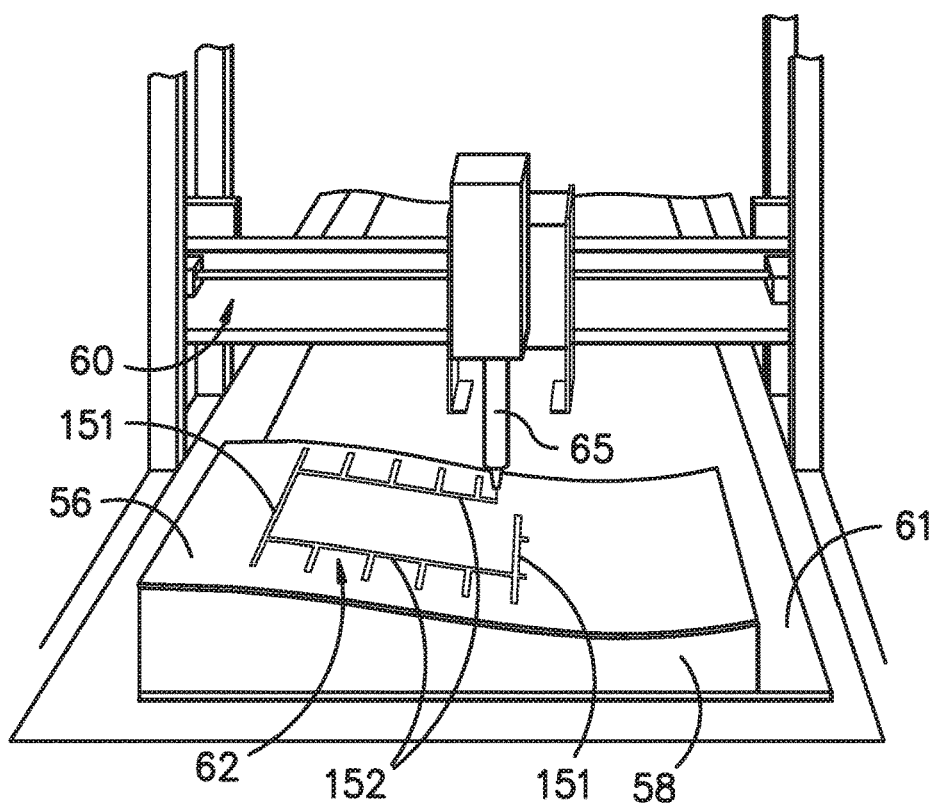
FIG. -11-

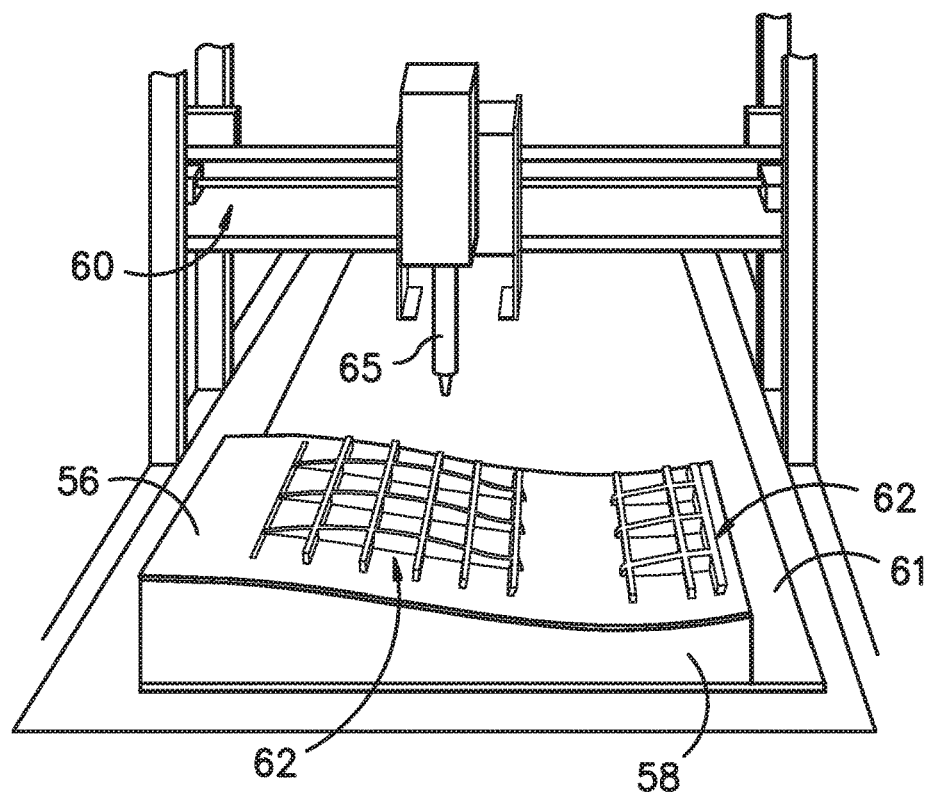
FIG. -12-
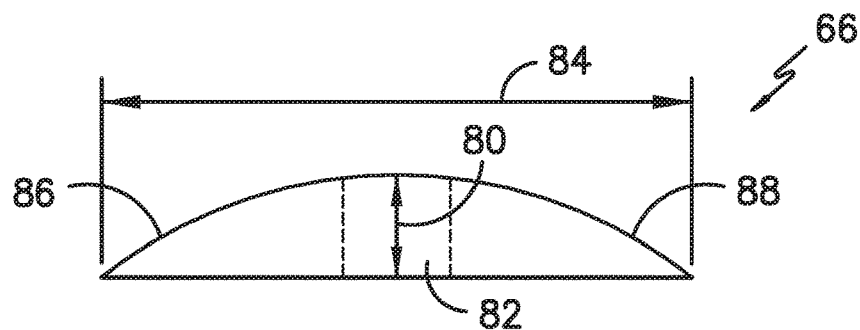
FIG. -13-
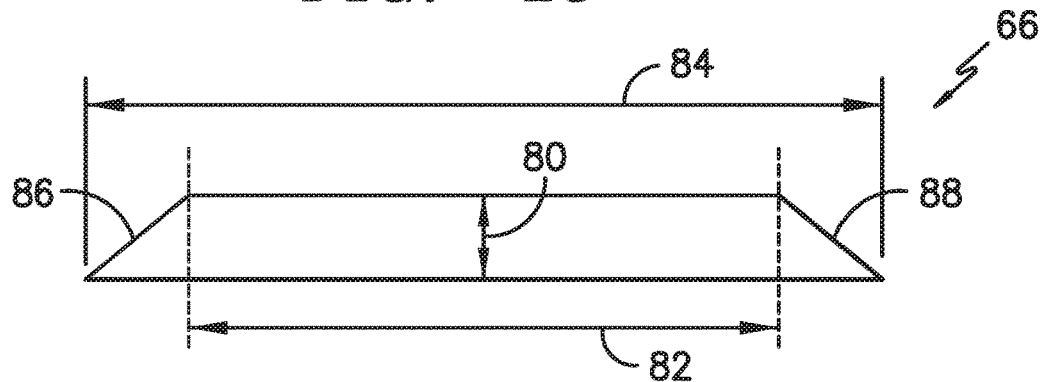
FIG. -14-

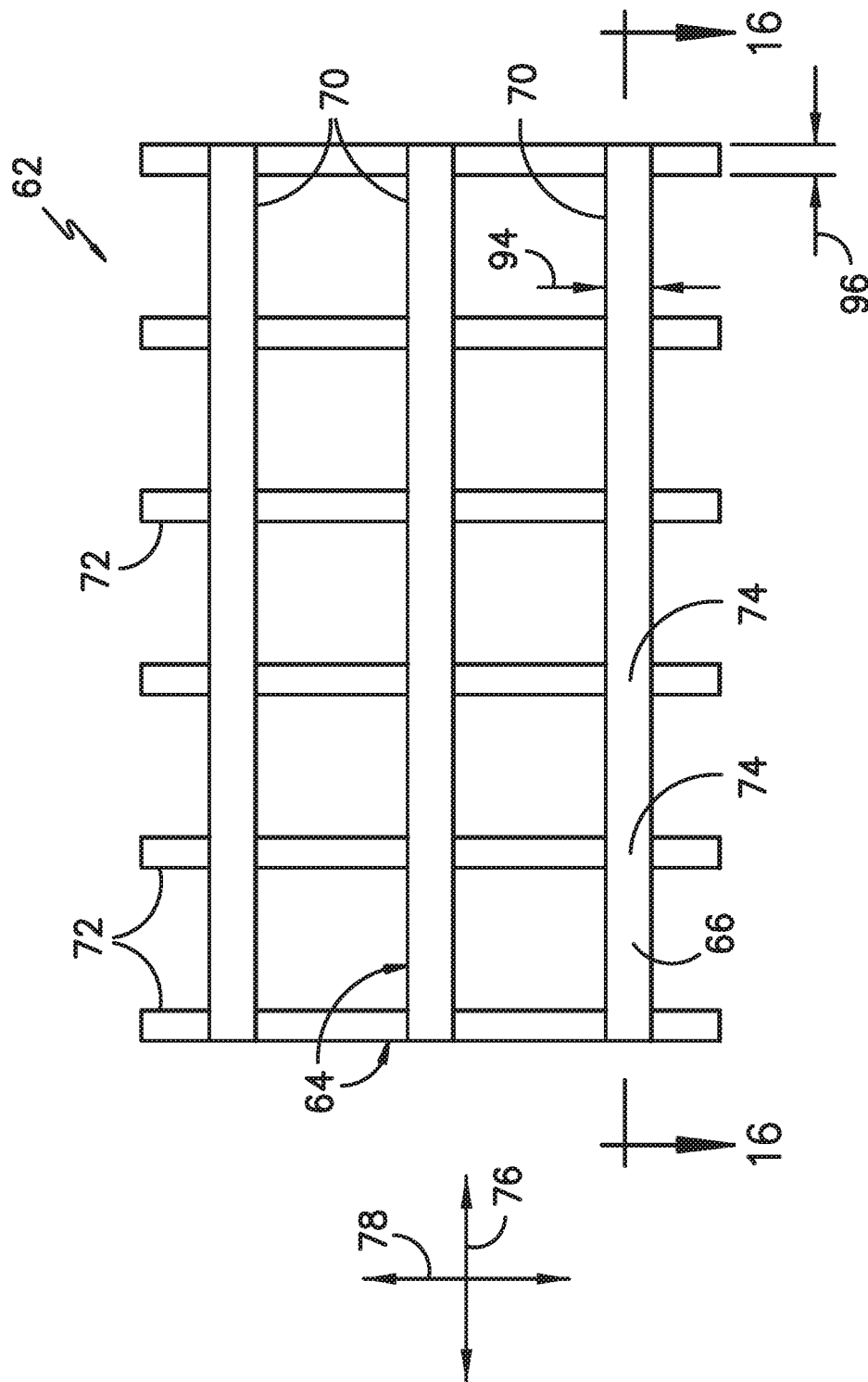
FIG. -15-

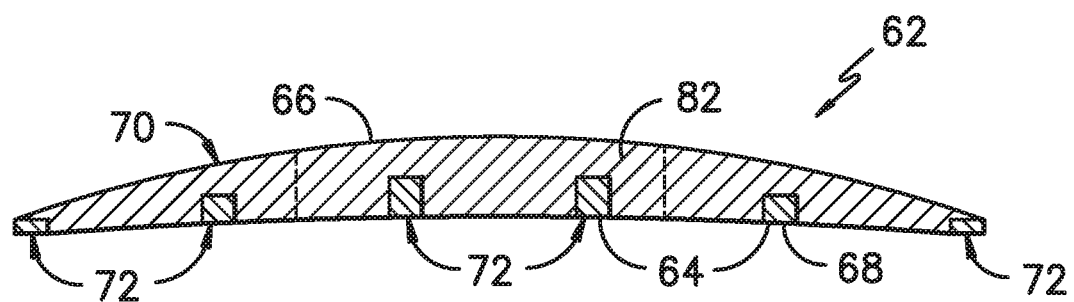
FIG. -16-
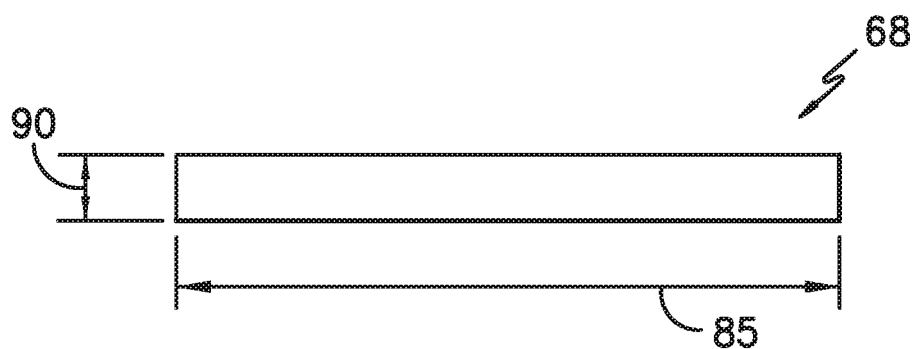
FIG. -17-

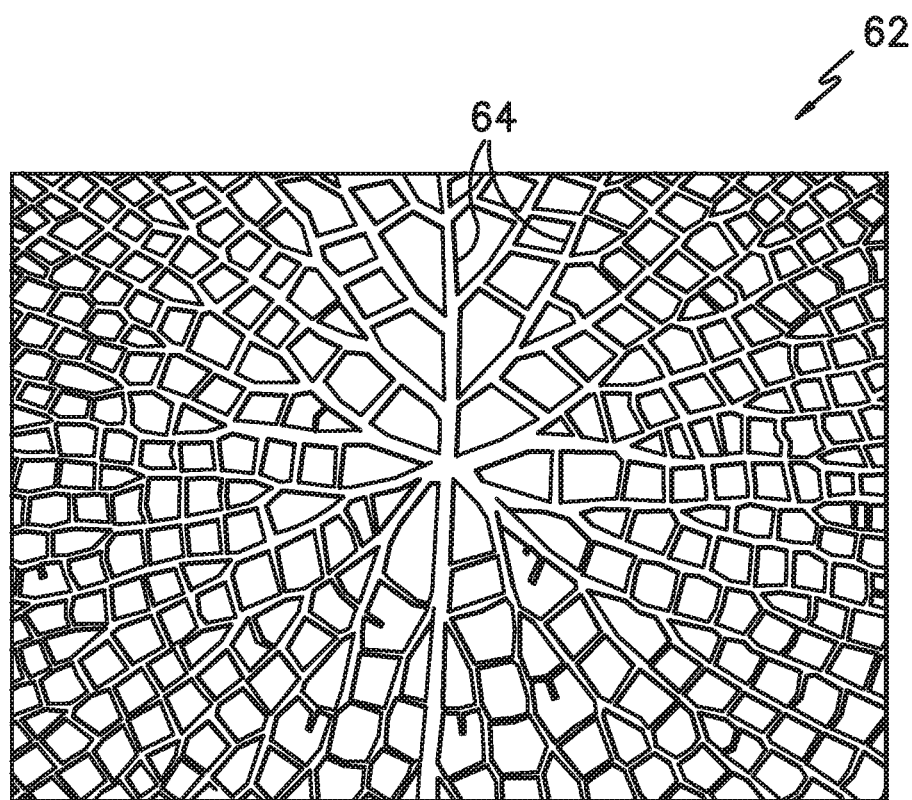
FIG. -18-
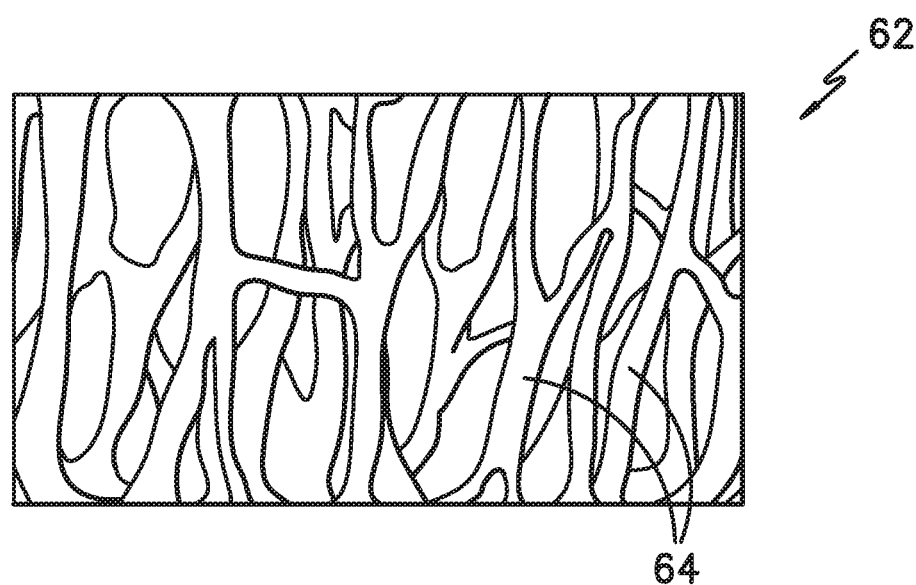
FIG. -19-

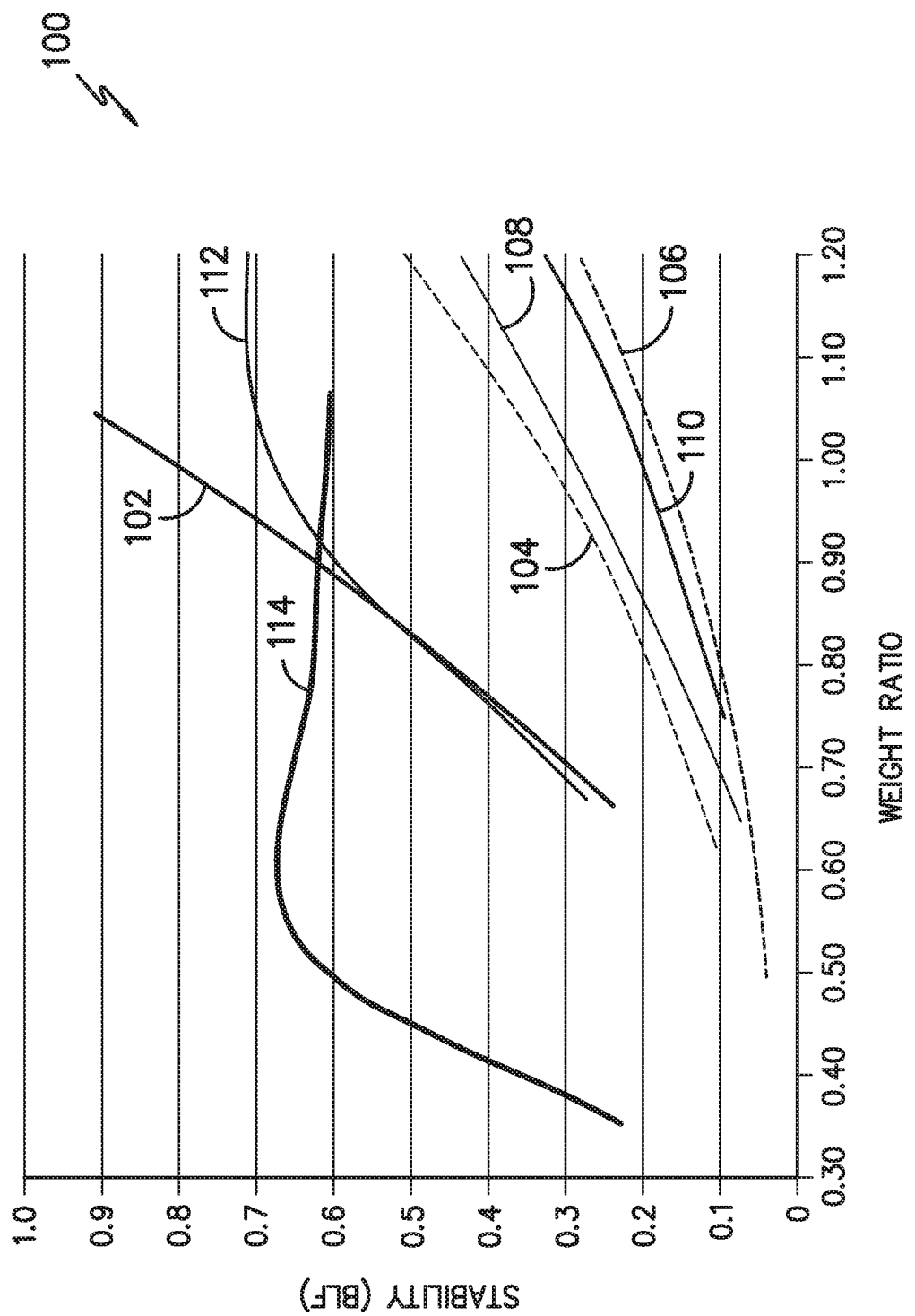
FIG. -20-

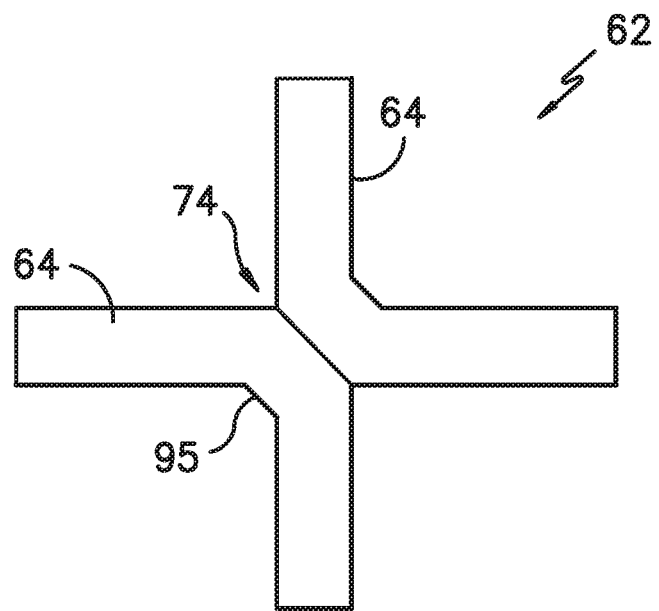
FIG. -21-
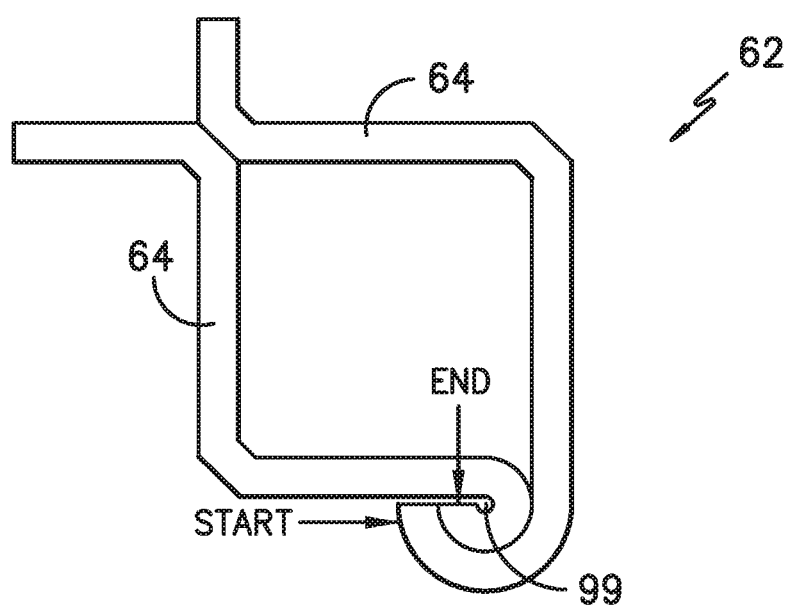
FIG. -22-

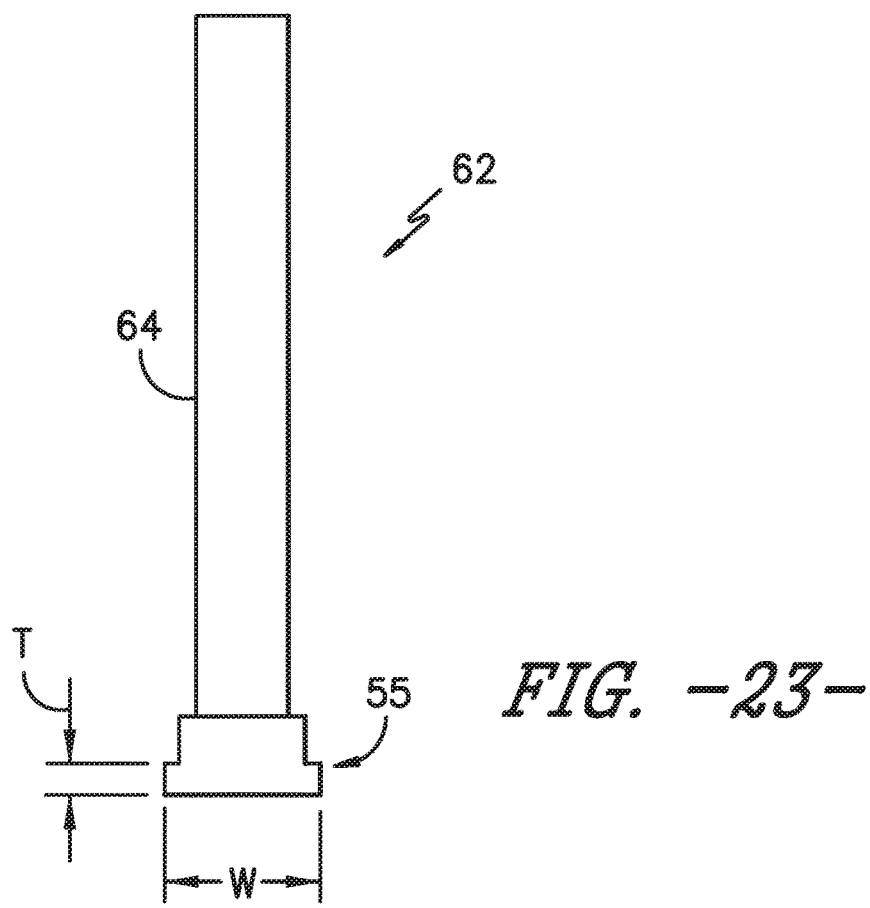
FIG. -23-
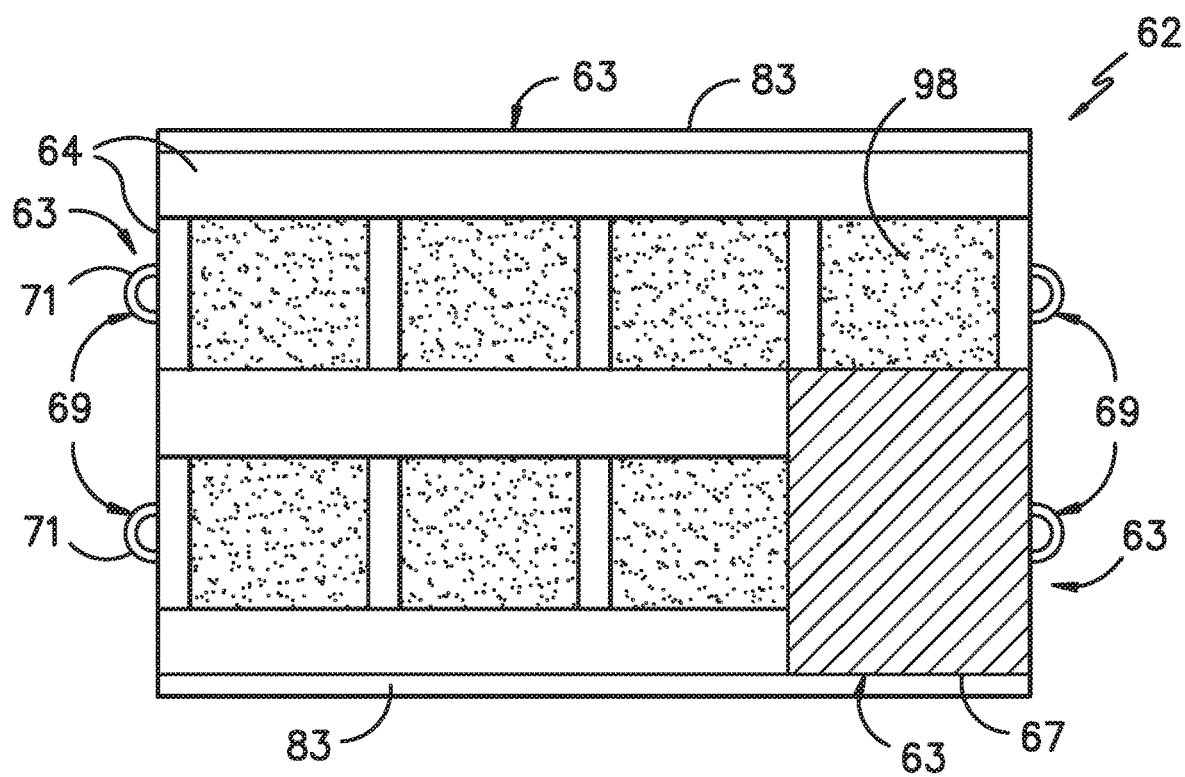
FIG. -24-

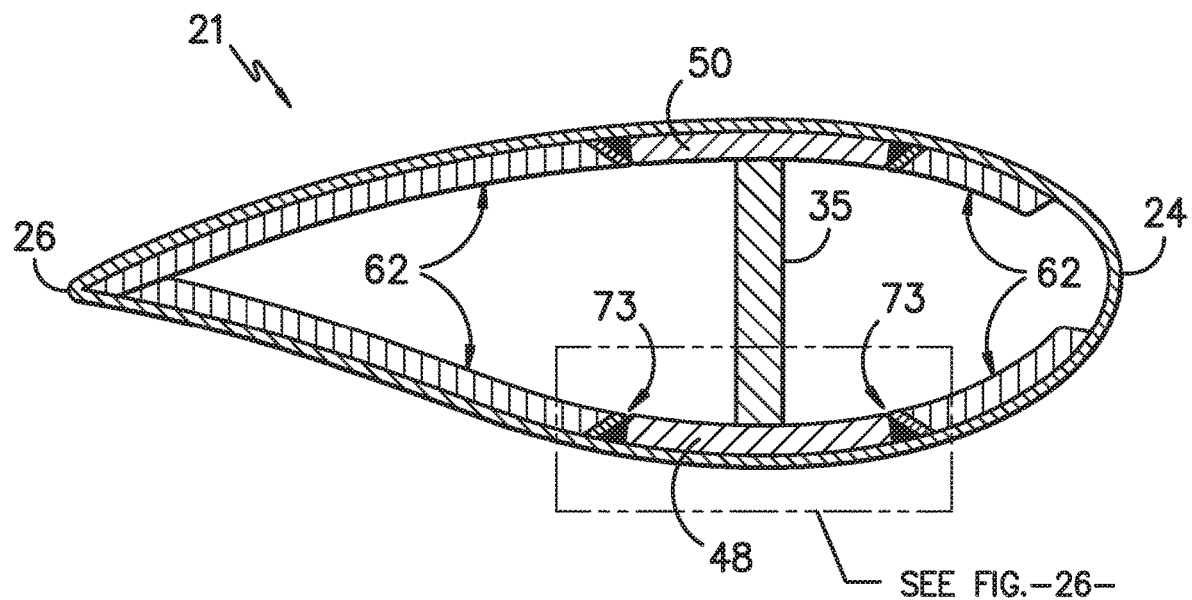
FIG. -25-
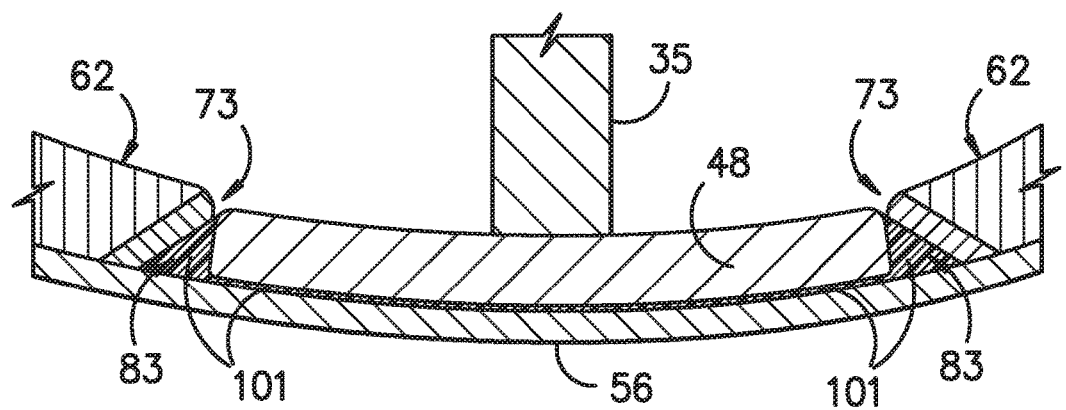
FIG. -26-

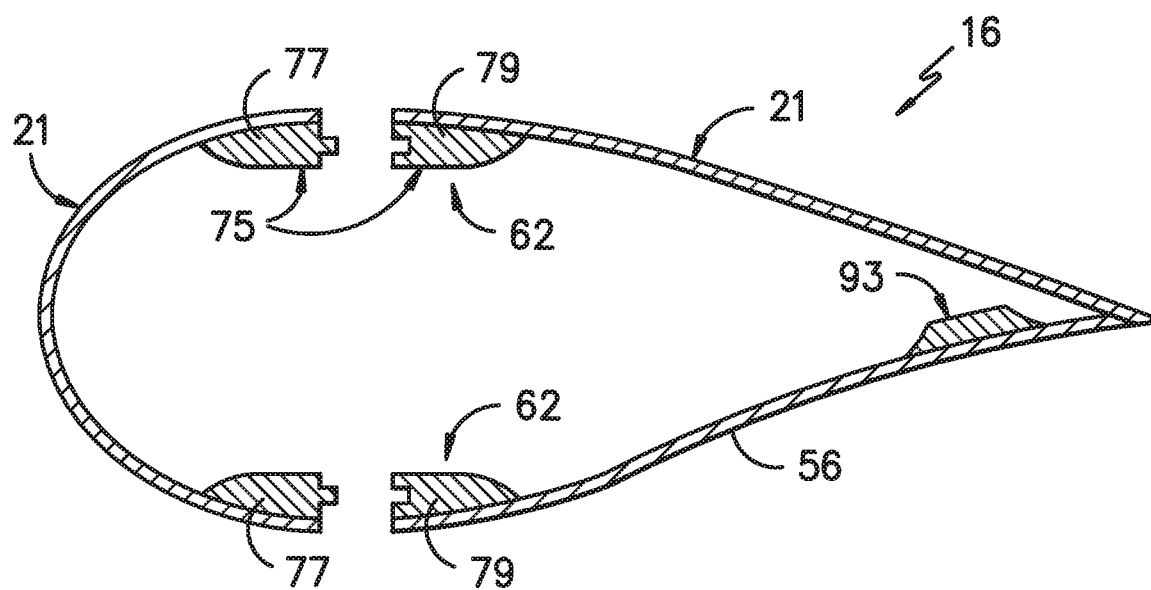
FIG. -27-
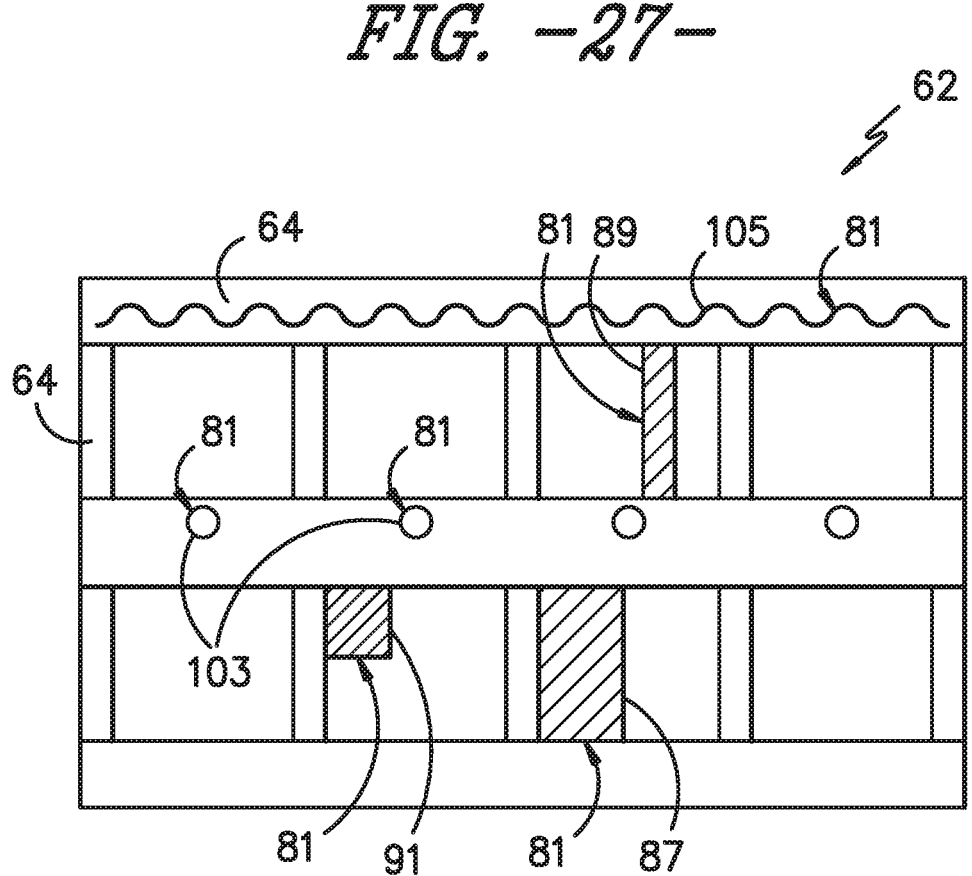
FIG. -28-

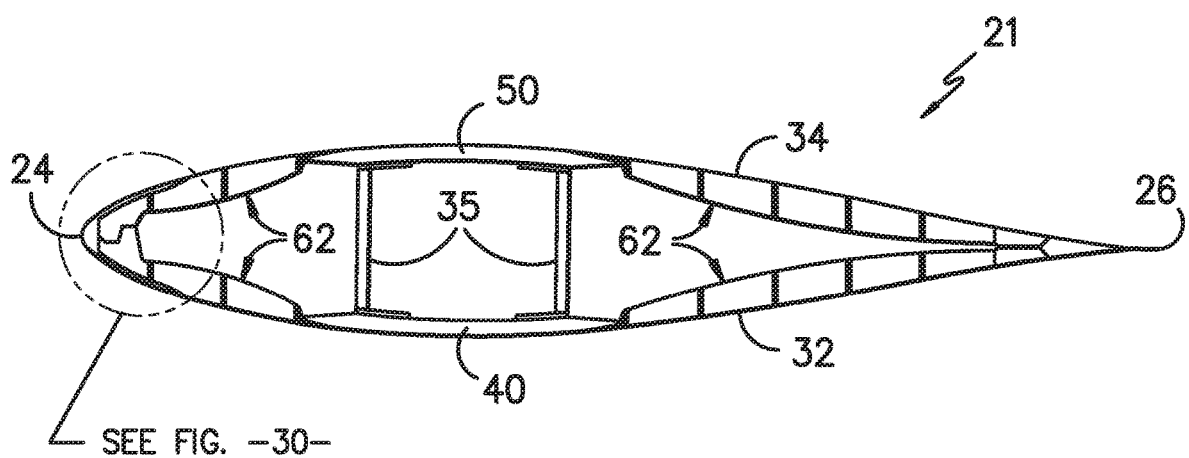
FIG. -29-
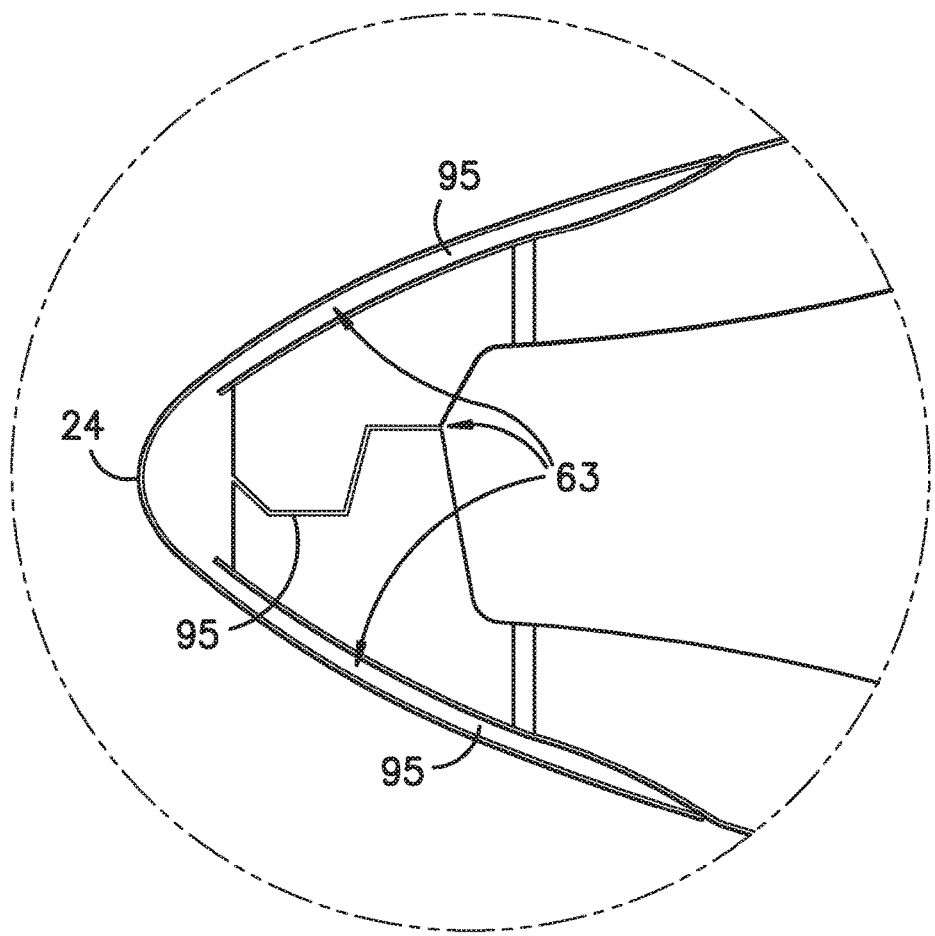
FIG. -30-

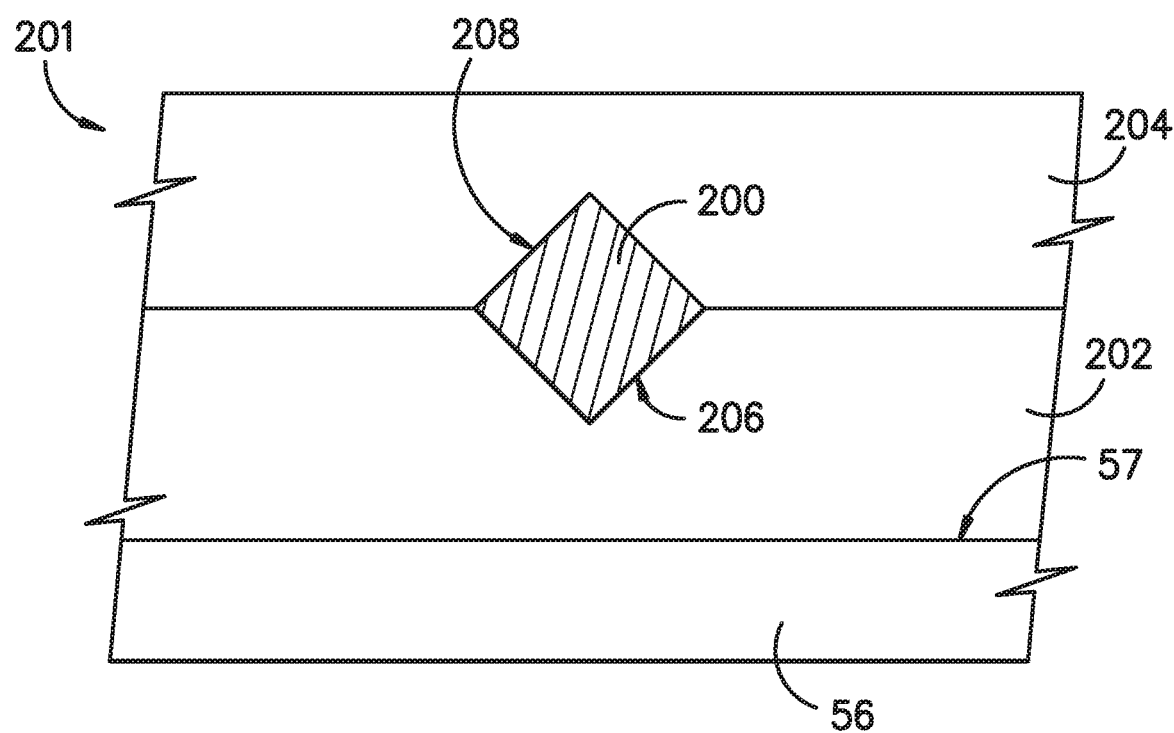
FIG. -31-

MULTIPLE MATERIAL COMBINATIONS FOR PRINTED REINFORCEMENT STRUCTURES OF ROTOR BLADES

FIELD

The present disclosure relates in general to wind turbine rotor blades, and more particularly to apparatuses for methods of manufacturing wind turbine rotor blade panels.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves.

The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin. Accordingly, conventional rotor blades generally have a sandwich panel configuration. As such, conventional blade manufacturing of large rotor blades involves high labor costs, slow through put, and low utilization of expensive mold tooling. Further, the blade molds can be expensive to customize.

Thus, methods for manufacturing rotor blades may include forming the rotor blades in segments. The blade segments may then be assembled to form the rotor blade. For example, some modern rotor blades, such as those blades described in U.S. patent application Ser. No. 14/753,137 filed Jun. 29, 2015 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component.

In view of the foregoing, the art is continually seeking improved methods for manufacturing wind turbine rotor blade panels having printed grid structures.

BRIEF DESCRIPTION

Aspects and advantages of the invention will be set forth in part in the following description, or may be obvious from the description, or may be learned through practice of the invention.

Rotor blade panels are generally provided, along with methods of their formation. In one embodiment, the rotor blade panel includes one or more fiber-reinforced outer skins having an inner surface; and, a plurality of reinforcement structures on the inner surface of the one or more fiber-reinforced outer skins, where the reinforcement structure bonds to the one or more fiber-reinforced outer skins as the reinforcement structure is being deposited. The reinforcement structure includes, at least, a first composition and a second composition, with the first composition being different than the second composition.

In one embodiment, the rotor blade panel may include one or more fiber-reinforced outer skins having an inner surface; and, a plurality of reinforcement structures on the inner surface of the one or more fiber-reinforced outer skins, where the reinforcement structure bonds to the one or more fiber-reinforced outer skins as the reinforcement structure is being deposited. The reinforcement structure may include, at least, a rib structure having a first composition in a first portion of its cross-section and a different, second composition in a second portion of its cross-section.

Methods for manufacturing a rotor blade panel may include forming one or more fiber-reinforced outer skins on a mold of the rotor blade panel; and, forming a plurality of rib members that intersect at a plurality of nodes to form at least one three-dimensional (3-D) reinforcement grid structure onto an inner surface of the one or more fiber-reinforced outer skins. The grid structure bonds to the one or more fiber-reinforced outer skins as the grid structure is being deposited, where the plurality of rib structures includes, at least, a first composition and a second composition, with the first composition being different than the second composition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure;

FIG. 7 illustrates a cross-sectional view of the modular rotor blade of FIG. 2 according to the present disclosure;

FIG. 8 illustrates a side view of one embodiment of a mold of a rotor blade panel, particularly illustrating an outer skin placed in the mold with a plurality of grid structures printed thereto;

FIG. 9 illustrates a perspective view of one embodiment of a grid structure according to the present disclosure;

FIG. 10 illustrates a perspective view of one embodiment of a mold of a rotor blade panel with a three-dimensional printer positioned above the mold so as to print a grid structure thereto according to the present disclosure;

FIG. 11 illustrates a perspective view of one embodiment of a mold of a rotor blade panel with a three-dimensional printer positioned above the mold and printing an outline of a grid structure thereto according to the present disclosure;

FIG. 12 illustrates a perspective view of one embodiment of a mold of a rotor blade panel with a three-dimensional printer positioned above the mold and printing a grid structure thereto according to the present disclosure;

FIG. 13 illustrates a cross-sectional view of one embodiment of a first rib member of a grid structure according to the present disclosure;

FIG. 14 illustrates a cross-sectional view of another embodiment of a first rib member of a grid structure according to the present disclosure;

FIG. 15 illustrates a top view of one embodiment of a grid structure according to the present disclosure;

FIG. 16 illustrates a cross-sectional view of one embodiment of a first rib member and intersecting second rib members of a grid structure according to the present disclosure;

FIG. 17 illustrates a side view of one embodiment of a second rib member of a grid structure according to the present disclosure;

FIG. 18 illustrates a top view of one embodiment of a grid structure according to the present disclosure, particularly illustrating rib members of the grid structure arranged in a desired pattern;

FIG. 19 illustrates a perspective view of another embodiment of a grid structure according to the present disclosure, particularly illustrating rib members of the grid structure arranged in a desired pattern;

FIG. 20 illustrates a graph of one embodiment of buckling load factor (y-axis) versus weight ratio (x-axis) of a grid structure according to the present disclosure;

FIG. 21 illustrates a partial, top view of one embodiment of a printed grid structure according to the present disclosure, particularly illustrating a node of the grid structure;

FIG. 22 illustrates a partial, top view of one embodiment of a printed grid structure according to the present disclosure, particularly illustrating a start printing location and an end printing location of the grid structure;

FIG. 23 illustrates an elevation view of one embodiment of a printed rib member of a grid structure according to the present disclosure, particularly illustrating a base section of one of the rib members of the grid structure having a wider and thinner cross-section than the remainder of the rib member so as to improve bonding of the grid structure to the outer skins of the rotor blade panel;

FIG. 24 illustrates a top view of another embodiment of a grid structure according to the present disclosure, particularly illustrating additional features printed to the grid structure;

FIG. 25 illustrates a cross-sectional view of one embodiment of a rotor blade having a printed grid structure arranged therein according to the present disclosure, particularly illustrating alignment features printed to the grid structure for receiving the spar caps and shear web;

FIG. 26 illustrates a partial, cross-sectional view of the rotor blade of FIG. 25, particularly illustrating additional features printed to the grid structure for controlling adhesive squeeze out;

FIG. 27 illustrates a cross-sectional view of one embodiment of a rotor blade having printed grid structures arranged therein according to the present disclosure, particularly illustrating male and female panel alignment features printed to the grid structure;

FIG. 28 illustrates a top view of yet another embodiment of a grid structure according to the present disclosure, particularly illustrating auxiliary features printed to the grid structure;

FIG. 29 illustrates a cross-sectional view of one embodiment of a rotor blade panel according to the present disclosure, particularly illustrating a plurality of grid structures printed to inner surfaces of the rotor blade panel;

FIG. 30 illustrates a partial, cross-sectional view of the leading edge of the rotor blade panel of FIG. 29, particularly illustrating a plurality of adhesive gaps; and FIG. 31 shows a cross-sectional view of an exemplary rotor blade panel having a prefabricated member positioned over the inner surface of the outer skin.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Generally, methods for manufacturing reinforcement structures for wind turbine rotor blades are provided using automated deposition of materials via technologies such as 3-D Printing, additive manufacturing, automated fiber deposition, as well as other techniques that utilize computer numeric control (CNC) device and multiple degrees of freedom to deposit material. As such, the reinforcement structures of the present disclosure are useful for reinforcing an outer skin for a wind turbine rotor blade. The materials used to form the reinforcement structures can be selected so as to tailor the properties of the reinforcement structures, while maximizing other benefits (e.g., weight, stiffness, etc.).

For example, multiple materials may be used to create the reinforcement structures, forming a composite part, such as foamed plastics, thermoplastics, or a plastic or foam matrix loaded with a constituent, such as fibers (e.g., glass or carbon fibers), microspheres (e.g., glass or polymer microspheres), other particles, or mixtures thereof. Such a constituent may be included within the matrix to reduce weight, save cost, improve properties, etc. Additionally, a sandwich structure can be formed within the ribs, such as by continuous tape deposition, a tailored design for spanwise buckling, inclusion of prefab parts within the structure, the use of recycled material (e.g., recycled fibers and/or recycled thermoplastics), the use of different thermoplastic blends to improve welding adhesive strength and also higher flowrate printing speed. Due to the additive manufacturing techniques, there is the ability for more customized reinforcement compared to conventional sandwich panels (e.g., made with vacuum infusion or other techniques).

As stated, multiple materials may be used to form the reinforcement structure (e.g., a plurality of rib members). In one particular embodiment, lightweight foamed plastics may be used to build up the reinforcement structures in combination with more rigid structural features to minimize weight and cost to final part. Variations in microsphere and/or fiber loading may also be used to custom tailor the local buckling resistance. Glass or polymer microspheres could also be used to increase stiffness, strength (in some cases), reduce part weight, and save cost.

Thus, the methods described herein provide many advantages not present in the prior art. For example, the methods of the present disclosure provide the ability to easily customize blade structures having various curvatures, aerodynamic characteristics, strengths, stiffness, etc. As such, the printed structures of the present disclosure can be designed to match the stiffness and/or buckling resistance of existing sandwich panels for rotor blades. More specifically, the rotor blades and components thereof of the present disclosure can be more easily customized based on the local buckling resistance needed. Still further advantages include the ability to locally and temporarily buckle to reduce loads and/or tune the resonant frequency of the rotor blades to avoid problem frequencies. Moreover, the grid structures described herein enable bend-twist coupling of the rotor blade.

In addition, the methods of the present disclosure provide a high level of automation, faster throughput, and reduced tooling costs and/or higher tooling utilization. Further, the rotor blade components of the present disclosure may not require adhesives, especially those produced with thermoplastic materials, thereby eliminating cost, quality issues, and extra weight associated with bond paste.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades. Further, the methods described herein may also apply to manufacturing any similar structure that benefits from printing a structure directly to skins within a mold before the skins have cooled so as to take advantage of the heat from the skins to provide adequate bonding between the printed structure and the skins, or injecting heat into the mold if needed to maintain a favorable skin temperature for bonding. As such, the need for additional adhesive or additional curing is eliminated or reduced.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, flruopolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. For example, in one embodiment, a semi-crystalline thermoplastic resin that is modified to have a slow rate of crystallization may be used. In addition, blends of amorphous and semi-crystalline polymers may also be used.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Referring particularly to FIGS. 2-4, any number of blade segments 21 or panels having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, in certain embodiments, the blade panels 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54.

Thus, where the blade segments 21 are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be prefabricated from the thermoplastic or thermoset resins, such as a pultruded member. As used herein, the terms "pultruded," "pultrusions," or similar generally encompass reinforced materials (e.g. fibers or woven or braided strands) that are impregnated with a resin and pulled through a stationary die such that the resin cures or undergoes polymerization while passing through the die. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In one embodiment, for example, the prefabricated member (e.g., spar caps 48, 50, 51, 53) may be made of a first thermoplastic material and positioned on the inner surface of the outer skin. Then, a second thermoplastic material may be printed over the inner surface such that at least a portion of the second thermoplastic material contacts the prefabricated member. The prefabricated member and the second thermoplastic material may then be cooled to define the first rib structure and the second rib structure. In such an embodiment, cooling the thermoplastics together can facilitate bonding between the outer skin and the thermoplastic materials, as well as bonding between the thermoplastic materials themselves.

In particular embodiments, such as shown in FIG. 31, a prefabricated member 200 may be positioned between layers 202, 204 of the printed material 201 over an inner surface 57 of an outer skin 56. In one embodiment, the first layer 202 of material forms an opening 206 (e.g., a pocket, slot, or other aperture) to receive the prefabricated member 200 therein. For example, the material of first layer 202 may still be warm when the prefabricated member 200 is positioned within the opening 206, such that upon cooling, the prefabricated member 200 is secured within the opening 206 (e.g., via thermoplastic bonding/welding and/or mechanical bonding through shrinkage of the material of the first layer 202 upon cooling). In such an embodiment, the second layer 204 is optional due to the attachment of the prefabricated member 200 to the first layer 202.

In other embodiments, the first layer 202 of a first composition (e.g., a thermoplastic material, a thermoset material, etc.) may be printed directly onto the inner surface 57 of the outer skin 56, followed by positioning the prefabricated member 200 onto the first layer 202, and then a second layer 204 of a second composition (e.g., a thermoplastic material, a thermoset material, etc.), which may or may not be the same as the first composition) may be printed onto the prefabricated member 200 and the first layer 202. In one embodiment, an opening 206 may be printed in the first layer 206 (e.g., to the shape of the prefabricated member 200) such that the prefabricated member 200 may be positioned therein. Additionally, the second layer 204 may be printed with an opening 208 therein (e.g., to the shape of the prefabricated member 200). By printing such openings 206, 208 in the first and/or second layers 202, 204, the prefabricated member 200 may be enclosed in at least a portion over the top such that the prefabricated member 200 is mechanically secured within the printed material 201. As such, the prefabricated member 200 need not be bonded to the first and/or second layers 202, 204 via thermoplastic welding. As such, the prefabricated member 200 may be sandwiched between the layers 202, 204 of printed material 201 so as to be secured therein. One or both of the first and second layers 202, 204 may include printed material that is different than the material of the prefabricated member 200. However, in other embodiments, the prefabricated member 200 may be bonded to the first and/or second layers 202, 204 so as to be more secured to the printed material 201 (e.g., through thermoplastic welding).

In addition, the prefabricated components may be produced from rovings, which generally encompass long and narrow bundles of fibers that are not combined until joined by a cured resin.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Referring now to FIGS. 8-19, the present disclosure is directed to methods for manufacturing rotor blade panels 21 and/or tip segments having at least one printed reinforcement structure 62 formed via 3-D printing, e.g. such as the blade segments illustrated in FIGS. 2-7. As such, in certain embodiments, the rotor blade panel 21 may include a pressure side surface, a suction side surface, a trailing edge segment, a leading edge segment, or combinations thereof. 3-D printing, as used herein, is generally understood to encompass processes used to synthesize three-dimensional objects in which successive layers of material are formed under computer control to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes.

Referring particularly to FIG. 10, one embodiment of the method includes placing a mold 58 of the rotor blade panel 21 relative to a CNC device 60. More specifically, as shown in the illustrated embodiment, the method may include placing the mold 58 into a bed 61 of the CNC device 60. Alternatively, the method may include placing the mold 58 under the CNC device 60 or adjacent the CNC device 60. Further, as shown in FIGS. 8 and 10, the method of the present disclosure further includes forming one or more fiber-reinforced outer skins 56 in the mold 58 of the rotor blade panel 21. In certain embodiments, the outer skin(s) 56 may include one or more continuous, multi-axial (e.g. biaxial) fiber-reinforced thermoplastic or thermoset outer skins. Further, in particular embodiments, the method of forming the fiber-reinforced outer skins 56 may include at least one of injection molding, 3-D printing, 2-D pultrusion, 3-D pultrusion, thermoforming, vacuum forming, pressure forming, bladder forming, automated fiber deposition, automated fiber tape deposition, or vacuum infusion.

In addition, as shown, the outer skin(s) 56 of the rotor blade panel 21 may be curved. In such embodiments, the method may include forming the curvature of the fiber-reinforced outer skins 56. Such forming may include providing one or more generally flat fiber-reinforced outer skins, forcing the outer skins 56 into a desired shape corresponding to a desired contour, and maintaining the outer skins 56 in the desired shape during printing and depositing. As such, the outer skins 56 generally retain their desired shape when the outer skins 56 and the grid structure 62 printed thereto are released. In addition, the CNC device 60 may be adapted to include a tooling path that follows the contour of the rotor blade panel 21.

The method also includes printing and depositing the grid structure 62 directly to the fiber-reinforced outer skin(s) 56 via the CNC device 60. More specifically, as shown in FIGS. 9, 10, 12, and 15, the CNC device 60 is configured to print and deposit a plurality of rib members 64 that intersect at a plurality of nodes 74 to form the grid structure 62 onto an inner surface of the one or more fiber-reinforced outer skins 56.

Referring now to FIGS. 8 and 10, the present disclosure is directed to embodiments of an apparatus and methods of manufacturing rotor blade panels 21 having at least one printed reinforcement structure 62 (shown in the form of a grid structure) formed via 3-D printing (e.g., blade segments illustrated in regard to FIGS. 2-7). As stated above, the reinforcement structure 62 may be formed with multiple compositions (e.g., a first composition, a second composition, a third composition, . . . an "nth" composition, etc.) so as to tailor the properties of the reinforcement structure 62.

For example, referring to FIG. 8, the reinforcement structure 62 may include a plurality of first ribs 151 having a first composition, a plurality of second ribs 152 having a second composition, and an optional plurality of third ribs 153 having a third composition, with each of the first composition, the second composition, and the third composition being different from each other. Of course, any suitable number of compositions may be utilized as desired.

In one embodiment, the first composition, the second composition, and the optional third composition are formed from a matrix (e.g., a plastic matrix, such as a thermoplastic matrix or a thermoset matrix) loaded with a constituent (e.g., fibers and/or microspheres or other particles), with a variation of the loading concentration of the constituent being a difference between the first, second, and third compositions. For example, the first composition and the second composition may be formed using the same matrix material and the same constituent, with the first composition including more of (i.e., a higher concentration/density of) the constituent than the second composition. Particularly suitable constituents for loading in to the matrix include, but are not limited to fibers (e.g., glass fibers, carbon fibers, etc.) and microspheres (e.g., glass microspheres, carbon microspheres, etc.).

When loaded with fibers, the difference between the first, second, and the optional third compositions can be in the fiber aspect ratio of the fibers. That is, the first composition may include a first fiber aspect ratio, the second composition may include a second fiber aspect ratio that is different than the first fiber aspect ratio, etc. As used herein, the fiber aspect ratio is defined by the fiber length/fiber diameter. When a fiber is embedded in a matrix and subjected to a tensile load parallel to the fiber, the applied stress on the matrix is transferred to the fiber across the interface. The tensile stress in the fiber is zero at the fiber ends and increases along the fiber length to a maximum in the center; conversely, the shear stress in the interface is a maximum at the fiber ends and reduces almost to zero in the center. The rate of stress build-up along the length of the fiber is dependent on the adhesion between the fiber and the matrix and constituent elastic properties. Depending on the aspect ratio, thermoplastic composites are classified as continuous or discontinuous (long and short fibers) based on the critical fiber length of the fibers.

In one particular embodiment, at least one of the compositions (e.g., the first composition and/or the second composition) may include a fiber having a length that is equal to or greater than the critical length for the fiber to be loaded to its maximum stress. If the length of fiber is less than the critical length, the matrix will flow plastically around the fiber, and the fiber is not loaded to its maximum stress. For example, discontinuous fiber-reinforced composites have aspect ratios varying from about 4 to about 2000, which corresponds to fiber lengths equal or less than the critical fiber length. Short fiber reinforced thermoplastic (SFT) composites have fiber lengths less than the critical fiber length. Conversely, long fiber reinforced thermoplastics (LFT) have fiber lengths greater or equal to the critical fiber length. LFTs have mechanical properties approaching that of continuous fibers. In one particular embodiment, the LFT may be formed from commercially available pre-impregnated pellets (i.e., including the fiber and the matrix).

In one embodiment, for instance, the matrix can be a PETG matrix containing fiberglass fibers. A preferred fiberglass matrix may be Elium® resin (Arkema SA, Colombes, France), which is a PMMA based resin. An alternative is to use other thermoplastic resins that would be compatible with Elium/PMMA. Such resins could be ABS, polycarbonate (PC) or a ABS/PC blend. Both ABS and PC are easily glass reinforced. In addition, blends of PMMA with ABS, PC or other thermoplastics may enable successful welding due to the incorporation of the PMMA phase along with a second thermoplastic.

In one embodiment, the thermoplastic material may be tailored to achieve a desired flowrate (through the nozzle of the device 60). For example, a polycarbonate (PC) matrix with glass fiber loading (e.g., about 20% to about 50% loading by weight) may have improved flowrate through the addition of PET resin (e.g., up to about 10% by weight) to aid the extrusion/deposition process and also may improve other properties, such as improved adhesion.

The compositions may also vary based on plastic material composition. For example, the first composition may have a different plastic material than the second composition so as to tailor the properties of the reinforcement structure 62. In certain instances, it may be advantageous to customize the blend of a thermoplastic for tailoring optimal physical properties and or processing characteristics. For example, a blend of an amorphous and a semicrystalline thermoplastic can be tuned by varying the percentages of each within the blend. A semicrystalline thermoplastic may have desirable physical properties, but may be difficult to process in a printing process due to its sharp transition from solid to liquid at its melting point. A more amorphous thermoplastic may have a much wider processing window for printing but less desirable physical properties. By tuning the percentages of the two in a blend, the balance between properties and processing needs can be optimized. This concept can be used to provide a continuum of material combinations throughout a printed blade structure by varying the blend ratio of two different materials. In addition this blending variation strategy can be used to further optimize for cost reduction as one material may be less expensive versus the second.

In one embodiment, the reinforcement structure 62 bonds to the fiber-reinforced outer skin(s) 56 as the structure 62 is being deposited, which eliminates the need for additional adhesive and/or curing time. For example, in one embodiment, the CNC device 60 is configured to print and deposit the rib members 64 onto the inner surface of the one or more fiber-reinforced outer skins 56 after the formed skin(s) 56 reach a desired state that enables bonding of the printed rib members 64 thereto, i.e. based on one or more parameters of temperature, time, and/or hardness. Therefore, in certain embodiments, wherein the skin(s) 56 are formed of a thermoplastic matrix, the CNC device 60 may immediately print the rib members 64 thereto as the forming temperature of the skin(s) 56 and the desired printing temperature to enable thermoplastic welding/bonding can be the same). More specifically, in particular embodiments, before the skin(s) 56 have cooled from forming, (i.e. while the skins are still hot or warm), the CNC device 60 is configured to print and deposit the rib members 64 onto the inner surface of the one or more fiber-reinforced outer skins 56. For example, in one embodiment, the CNC device 60 is configured to print and deposit the rib members 64 onto the inner surface of the outer skins 56 before the skins 56 have completely cooled, so as to facilitate bonding between the skins 56 and the rib members 64. In addition, in another embodiment, the CNC device 60 is configured to print and deposit the rib members 64 onto the inner surface of the outer skins 56 when the skins 56 have partially cooled, or the mold temperature may be controlled to maintain a specific temperature of the skin for sufficient bonding of the ribs members. Thus, suitable materials for the grid structure 62 and the outer skins 56 can be chosen such that the grid structure 62 bonds to the outer skins 56 during deposition. Accordingly, the grid structure 62 described herein may be printed using the same materials or different materials.

In one embodiment, the CNC device 60 may be tailored to form ribs having short fiber composites and/or long fiber composites. For example, the CNC device 60 may include a general purpose screw with "feed-compression-metering" zones, where fiber-damaging shear may be reduced by lowering the compression ratio of the metering section. A metering section compression ratio of about 2:1 is particularly suitable for LFRT products. Additionally, the CNC device 60 may include a nozzle tip configured for forming a short fiber composite or a long fiber composite. For example, some thermoplastic materials may process more easily with a reverse-taper nozzle tip, which create a high degree of shear as material is injected. Such a nozzle tip would significantly degrade fiber length of a long fiber compound. Alternatively, a 100% "free-flow" fluted nozzle-tip/valve assembly may allow easy passage of long fibers through the nozzle and into the part.

For example, in one embodiment, a thermoset material may be infused into the fiber material on the mold 58 to form the outer skins 56 using vacuum infusion. As such, the vacuum bag is removed after curing and the one or more thermoset grid structures 62 can then be printed onto the inner surface of the outer skins 56. Alternatively, the vacuum bag may be left in place after curing. In such embodiments, the vacuum bag material can be chosen such that the material would not easily release from the cured thermoset fiber material. Such materials, for example, may include a thermoplastic material such as polymethyl methacrylate (PMMA) or polycarbonate film. Thus, the thermoplastic film that is left in place allows for bonding of thermoplastic grid structures 62 to the thermoset skins with the film in between.

In addition, the method of the present disclosure may include treating the outer skins 56 to promote bonding between the outer skins 56 and the grid structure 62. More specifically, in certain embodiments, the outer skins 56 may be treated using flame treating, plasma treating, chemical treating, chemical etching, mechanical abrading, embossing, elevating a temperature of at least areas to be printed on the outer skins 56, and/or any other suitable treatment method to promote said bonding. In additional embodiments, the method may include forming the outer skins 56 with more (or even less) matrix resin material on the inside surface to promote said bonding. In additional embodiments, the method may include varying the outer skin thickness and/or fiber content, as well as the fiber orientation.

Further, the method of the present disclosure includes varying the design of the grid structure 62 (e.g. materials, width, height, thickness, shapes, etc., or combinations thereof). As such, the grid structure 62 may define any suitable shape so as to form any suitable structure component, such as the spar cap 48, 50, the shear web 35, or additional structural components 52 of the rotor blade 16. For example, as shown in FIG. 11, the CNC device 60 may begin printing the grid structure 62 by first printing an outline of the structure 62 and building up the grid structure 62 with the rib members 64 in multiple passes. As such, extruders 65 of the CNC device 60 can be designed have any suitable thickness or width so as to disperse a desired amount of resin material to create rib members 64 with varying heights and/or thicknesses. Further, the grid size can be designed to allow local buckling of the face sheet in between the rib members 64, which can influence the aerodynamic shape as an extreme (gust) load mitigation device.

More specifically, as shown in FIGS. 9-15, the rib members 64 may include, at least, a first rib member 66 extending in a first direction 76 and a second rib member 68 extending in a different, second direction 78. In several embodiments, as shown in FIG. 15, the first direction 76 of the first set 70 of rib members 64 may be generally perpendicular to the second direction 78. More specifically, in certain embodiments, the first direction 76 may be generally parallel to a chord-wise direction of the rotor blade 16 (i.e. a direction parallel to the chord 25 (FIG. 2)), whereas the second direction 78 of the second set 72 of rib members 64 may be generally parallel with a span-wise direction of the rotor blade 16 (i.e. a direction parallel to the span 23 (FIG. 2)). Alternatively, in one embodiment, an off-axis orientation (e.g. from about 20° to about 70°) may be provided in the grid structure 62 to introduce bend-twist coupling to the rotor blade 16, which can be beneficial as passive load mitigation device. Alternatively, the grid structure 62 may be parallel the spar caps 48, 50.

Moreover, as shown in FIGS. 13 and 14, one or more of the first and second rib member(s) 66, 68 may be printed to have a varying height along a length 84, 85 thereof. In alternative embodiments, as shown in FIGS. 16 and 17, one or more of the first and second rib member(s) 66, 68 may be printed to have a uniform height 90 along a length 84, 85 thereof. In addition, as shown in FIGS. 9, 12, and 15, the rib members 64 may include a first set 70 of rib members 64 (that contains the first rib member 66) and a second set 72 of rib members 64 (that contains the second rib member 68).

In such embodiments, as shown in FIGS. 13 and 14, the method may include printing a maximum height 80 of either or both of the first set 70 of rib members 64 or the second set 72 of rib members 64 at a location substantially at (i.e. +/−10%) a maximum bending moment in the rotor blade panel 21 occurs. For example, in one embodiment, the maximum bending moment may occur at a center location 82 of the grid structure 62 though not always. As used herein, the term "center location" generally refers to a location of the rib member 64 that contains the center plus or minus a predetermined percentage of an overall length 84 of the rib member 64. For example, as shown in FIG. 13, the center location 82 includes the center of the rib member 64 plus or minus about 10%. Alternatively, as shown in FIG. 14, the center location 82 includes the center plus or minus about 80%. In further embodiments, the center location 82 may include less than plus or minus 10% from the center or greater than plus or minus 80% of the center.

In addition, as shown, the first and second sets 70, 72 of rib members 64 may also include at least one tapering end 86, 88 that tapers from the maximum height 80. More specifically, as shown, the tapering end(s) 86, 88 may taper towards the inner surface of the fiber-reinforced outer skins 56. Such tapering may correspond to certain blade locations requiring more or less structural support. For example, in one embodiment, the rib members 64 may be shorter at or near the blade tip and may increase as the grid structure 62 approaches the blade root. In certain embodiments, as shown particularly in FIG. 14, a slope of the tapering end(s) 86, 88 may be linear. In alternative embodiments, as shown in FIG. 13, the slope of the tapering end(s) 86, 88 may be non-linear. In such embodiments, the tapering end(s) 86, 88 provide an improved stiffness versus weight ratio of the panel 21.

In additional embodiments, one or more heights of intersecting rib members 64 at the nodes 74 may be different. For example, as shown in FIG. 16, the heights of the second set 72 of rib members 64 are different than the intersecting first rib member 66. In other words, the rib members 64 can have different heights for the different directions at their crossing points. For example, in one embodiment, the span-wise direction rib members 64 may have a height twice as tall as the height of the chord-wise direction rib members 64. In addition, as shown in FIG. 16, the second set 72 of rib members 64 may each have a different height from adjacent rib members 64 in the second set 72 of rib members 64. In such embodiments, as shown, the method may include printing each of the second set 70 of rib members 64 such that structures 64 having greater heights are located towards the center location 82 of the grid structure 62. In addition, the second set 70 of rib members 64 may be tapered along a length 85 thereof such that the rib members 64 are tapered shorter as the rib members approach the blade tip.

In further embodiments, as mentioned, the rib members 64 may be printed with varying thicknesses. For example, as shown in FIG. 15, the first set 70 of rib members 64 define a first thickness 94 and the second set 72 of rib members 64 define a second thickness 96. More specifically, as shown, the first and second thicknesses 94, 96 are different. In addition, as shown in FIGS. 18 and 19, the thicknesses of a single rib member 64 may vary along its length.

Referring particularly to FIG. 15, the first set 70 of rib members 64 and/or the second set 72 of rib members 64 may be evenly spaced. In alternative embodiments, as shown in FIGS. 18 and 19, the first set 70 of rib members 64 and/or the second set 72 of rib members 64 may be unevenly spaced. For example, as shown, the additive methods described herein enable complex inner structures that can be optimized for loads and/or geometric constraints of the overall shape of the rotor blade panel 21. As such, the grid structure 62 of the present disclosure may have shapes similar to those occurring in nature, such as organic structures (e.g. bird bones, leaves, trunks, or similar). Accordingly, the grid structure 62 can be printed to have an inner blade structure that optimizes stiffness and strength, while also minimizing weight.

In several embodiments, the cycle time of printing the rib members 64 can also be reduced by using a rib pattern that minimizes the amount of directional change. For example, 45-degree angled grids can likely be printed faster than 90-degree grids relative to the chord direction of the proposed printer, for example.

In another embodiment, as shown in FIGS. 8 and 12, the method may include printing a plurality of grid structures 62 onto the inner surface of the fiber-reinforced outer skins 56. More specifically, as shown, the plurality of grid structures 62 may be printed in separate and distinct locations on the inner surface of the outer skins 56.

Certain advantages associated with the grid structure 62 of the present disclosure can be better understood with respect to FIG. 20. As shown, the graph 100 illustrates the stability of the rotor blade 16 (represented as the buckling load factor "BLF") on the y-axis versus the weight ratio on the x-axis. Curve 102 represents the stability versus the weight ratio for a conventional sandwich panel rotor blade. Curve 104 represents the stability versus the weight ratio for a rotor blade having a non-tapered grid structure constructed of short fibers. Curve 106 represents the stability versus the weight ratio for a rotor blade having a non-tapered grid structure without fibers. Curve 108 represents the stability versus the weight ratio for a rotor blade having a grid structure 62 constructed of tapered rib members 64 with 1:3 slope and without fibers. Curve 110 represents the stability versus the weight ratio for a rotor blade having a grid structure 62 constructed of tapered rib members 64 with 1:2 slope and without fibers. Curve 112 represents the stability versus the weight ratio for a rotor blade 16 having a grid structure 62 containing short fibers having a first thickness and being constructed of tapered rib members 64 with 1:3 slope. Curve 114 represents the stability versus the weight ratio for a rotor blade 16 having a grid structure 62 containing short fibers having a second thickness that is less than the first thickness and being constructed of tapered rib members 64 with 1:3 slope. Thus, as shown, rib members 64 containing fibers maximize the modulus thereof, while thinner rib members minimize the weight added to the rotor blade 16. In addition, as shown, higher taper ratios increase the buckling load factor.

Referring now to FIGS. 21-23, various additional features of the grid structure 62 of the present disclosure are illustrated. More specifically, FIG. 21 illustrates a partial, top view of one embodiment of the printed grid structure 62, particularly illustrating one of the nodes 74 thereof. As shown, the CNC device 60 may form at least one substantially 45-degree angle 95 for a short distance at one or more of the plurality of nodes 74. As such, the 45-degree angle 95 is configured to increase the amount of abutment or bonding at the corners. In such embodiments, as shown, there may be a slight overlap in this corner node.

Referring particularly to FIG. 22, a partial, top view of one embodiment of the printed grid structure 62 is illustrated, particularly illustrating a start printing location and an end printing location of the grid structure 62. This helps with the startup and stop of printing the ribs. When the CNC device 60 begins to print the rib members 64 and the process accelerates, the extruders may not perfectly extrude the resin material. Thus, as shown, the CNC device 60 may start the printing process with a curve or swirl to provide a lead in for the rib structure 64. By extruding this swirl at the start location, the extruders 65 are given time to more slowly ramp up/down their pressure, instead of being required to instantaneously start on top of a narrow freestanding starting point. As such, the swirl allows for the grid structures 65 of the present disclosure to be printed at higher speeds.

In certain instances, however, this start curve may create a small void 99 (i.e. the area within the swirl) in the start region which can create issues as the void 99 propagates up through ongoing layers. Accordingly, the CNC device 60 is also configured to end one of the rib members 64 within the swirl of the start region so as to prevent the void 99 from developing. More specifically, as shown, the CNC device 60 essentially fills the start curve of the one of the rib members 64 with an end location of another rib member 64.

Referring particularly to FIG. 23, an elevation view of one embodiment of one of the rib members 64 of the printed grid structure 62 is illustrated, particularly illustrating a base section 55 of the rib members 64 having a wider W and thinner T first layer so as to improve bonding of the grid structure 62 to the outer skins 56 of the rotor blade panel 21. To form this base section 55, the CNC device 60 prints a first layer of the grid structure 62 such that the individual base sections 55 define a cross-section that is wider and thinner than the rest of the cross-section of the rib members 64. In other words, the wider and thinner base section 55 of the rib members 64 provides a larger surface area for bonding to the outer skins 56, maximum heat transfer to the outer skins 56, and allows the CNC device 60 to operate at faster speeds on the first layer. In addition, the base section 55 may minimize stress concentrations at the bond joint between the structure 62 and the outer skins 56. In one embodiment, such as in the embodiment of FIG. 23, the reinforcement structure 62 may be formed from multiple materials within each rib member 64. For example, the rib structure 64 may have a first composition in a first portion of its cross-section and a different, second composition in a second portion of its cross-section.

Referring now to FIGS. 24-29, the CNC device 60 described herein is also configured to print at least one additional feature 63 directly to the grid structure(s) 62, wherein heat from the printing bonds the additional features 63 to the structure 62. As such, the additional feature(s) 63 can be directly 3-D printed into the grid structure 62. Such printing allows for the additional feature(s) 63 to be printed into the grid structure 62 using undercuts and/or negative draft angles as needed. In addition, in certain instances, hardware for various blade systems can be assembled within the grid structure 62 and then printed over to encapsulate/protect such components.

For example, as shown in FIGS. 24-27, the additional feature(s) 63 may include auxiliary features 81 and/or assembly features 69. More specifically, as shown in FIGS. 24 and 25, the assembly feature(s) 69 may include one or more alignment structures 73, at least one handling or lift feature 71, one or more adhesive gaps or standoffs 95, or one or more adhesive containment areas 83. For example, in one embodiment, the CNC device 60 is configured to print a plurality of handling features 71 to the grid structure 62 to provide multiple gripping locations for removing the rotor blade panel 21 from the mold 58. Further, as shown in FIG. 24, one or more adhesive containment areas 83 may be formed into the grid structure 62, e.g. such that another blade component can be secured thereto or thereby.

In particular embodiments, as shown in FIGS. 25 and 26, the alignment or lead in structure(s) 73 may include any spar cap and/or shear web alignment features. In such embodiments, as shown, the grid structure(s) 62 may printed such that an angle of the plurality of rib members 64 is offset from a spar cap location so as to create an adhesive containment area 83. More specifically, as shown, the adhesive containment areas 83 are configured to prevent squeeze out of an adhesive 101. It should be further understood that such adhesive containment areas 83 are not limited to spar cap locations, but may be provided in any suitable location on the grid structure 62, including but not limited to locations adjacent to the leading edge 24, the trailing edge 26, or any other bond locations.

In further embodiments, the alignment structure(s) 73 may correspond to support alignment features (e.g. for reinforcement structure 52), blade joint alignment features, panel alignment features 75, or any other suitable alignment feature. More specifically, as shown in FIG. 27, the panel alignment features 75 may include a male alignment feature 77 or a female alignment feature 79 that fits with a male alignment feature 77 or a female alignment feature 79 of an adjacent rotor blade panel 21.

Further, as shown in FIG. 28, the additional feature(s) 63 may include at least one auxiliary feature 81 of the rotor blade panel 21. For example, in one embodiment, the auxiliary features 81 may include a balance box 67 of the rotor blade 16. In such embodiments, the step of printing the additional feature(s) 63 into the grid structure(s) 62 may include enclosing at least a portion of the grid structure 62 to form the balance box 63 therein. In additional embodiments, the auxiliary feature(s) 81 may include housings 87, pockets, supports, or enclosures e.g. for an active aerodynamic device, a friction damping system, or a load control system, ducting 89, channels, or passageways e.g. for deicing systems, one or more valves, a support 91, tubing, or channel around a hole location of the fiber-reinforced outer skins, a sensor system having one or more sensors 103, one or more heating elements 105 or wires 105, rods, conductors, or any other printed feature. In one embodiment, for example, the supports for the friction damping system may include sliding interface elements and/or free interlocking structures. For example, in one embodiment, the 3-D printed grid structure 62 offers the opportunity to easily print channels therein for providing warmed air from heat source(s) in the blade root or hub to have a de-icing effect or prevent ice formation. Such channels allow for air contact directly with the outer skins 56 to improve heat transfer performance.

In particular embodiments, the sensor system may be incorporated into the grid structure(s) 62 and/or the outer skins 56 during the manufacturing process. For example, in one embodiment, the sensor system may be a surface pressure measurement system arranged with the grid structure 62 and/or directly incorporated into the skins 56. As such, the printed structure and/the skins 56 are manufactured to include the series of tubing/channels needed to easily install the sensor system. Further, the printed structure and/or the skins 56 may also provide a series of holes therein for receiving connections of the system. Thus, the manufacturing process is simplified by printing various structures into the grid structure 62 and/or the skins 56 to house the sensors, act as the static pressure port, and/or act as the tubing that runs directly to the outer blade skin. Such systems may also enable the use of pressure taps for closed loop control of the wind turbine 10.

In still further embodiments, the mold 58 may include certain marks (such as a positive mark) that are configured to create a small dimple in the skin during manufacturing. Such marks allow for easy machining of the holes in the exact location needed for the associated sensors. In addition, additional sensor systems may be incorporated into the grid structures and/or the outer skin layers 56 to provide aerodynamic or acoustic measurements so as to allow for either closed loop control or prototype measurements.

In addition, the heating elements 80 described herein may be flush surface mounted heating elements distributed around the blade leading edge. Such heating elements 80 allow for the determination of the angle of attack on the blade by correlating temperature/convective heat transfer with flow velocity and the stagnation point. Such information is useful for turbine control and can simplify the measurement process. It should be understood that such heating elements 80 may also be incorporated into the outer skin layers 56 in additional ways and are not required to be flush mounted therein.

Referring back to FIG. 24, the method according to the present disclosure may include placing a filler material 98 between one or more of the rib members 64. For example, in certain embodiments, the filler material 98 described herein may be constructed of any suitable materials, including but not limited to low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), polyethylene terephthalate (PET) foams, other foam rubbers/resin-based foams and various other open cell and closed cell foams. In one embodiment, the density may be varied within each rib. For example, a first composition may form a core of the rib and may have density that is less than the second composition that forms an outer surface of the rib (e.g., the second composition may have a higher strength, such as a long fiber reinforced thermoplastic). In another embodiment, the first composition may form a first layer of the rib and may have density that is less than the second composition that forms another layer of the rib (e.g., the second composition may have a higher strength, such as a long fiber reinforced thermoplastic). For example, in one embodiment, a rib may be formed by printing a thermoplastic foam rib onto the inner surface of the fiberglass skin, and in particular embodiments may also include fibers within the thermoplastic foam. The, a denser (e.g., non-foamed) thermoplastic reinforced with fibers may be printed onto the thermoplastic foam. Thus, the rib structure may have a reduced weight and/or cost compared to a rib formed only with the denser, second composition.

In addition to the reinforcement structure 52, other features can be formed on the outer skins 56 as desired. Such features may also include additional compositions (e.g., a first composition, a second composition, etc.) as discussed above with respect to the reinforcement structure 52. Referring back to FIG. 27, the method may also include printing one or more features 93 onto the outer skins 56, e.g. at the trailing and/or leading edges of the rotor blade panels 21. For example, as shown in FIG. 27, the method may include printing at least one lightning protection feature 93 onto at least one of the one or more fiber-reinforced outer skins 56. In such embodiments, the lightning protection feature 93 may include a cooling fin or a trailing edge feature having less fiber content than the fiber-reinforced outer skins 56. More specifically, the cooling fins may be directly printed to the inside surface of the outer skins 56 and optionally loaded with fillers to improve thermal conductivity but below a certain threshold to address lightning related concerns. As such, the cooling fins are configured to improve thermal transfer from the heated airflow to the outer skins 56. In additional embodiments, such features 93 may be configured to overlap, e.g. such as interlocking edges or snap fits.

Referring now to FIGS. 29 and 30, the additional feature(s) 63 may include an adhesive gap 95 or stand-off, which may be incorporated into the grid structures 62. Such standoffs 95 provide a specified gap between two components when bonded together so to minimize adhesive squeeze out. As such, the standoffs 95 provide the desired bond gap for optimized bond strength based on the adhesive used.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade shell, the method comprising:
   forming one or more fiber-reinforced outer skins on a mold of the rotor blade shell via thermoforming; and,
   melting first and second compositions of material;
   before the one or more fiber-reinforced outer skins have completely cooled from thermoforming, printing and depositing, via computer numeric control (CNC) device, the melted first and second compositions of material to form at least one three-dimensional (3-D) reinforcement grid structure onto an inner surface of the one or more fiber-reinforced outer skins at least in part via additive manufacturing, the grid structure bonding to the one or more fiber-reinforced outer skins as the grid structure is being printed and deposited,
   wherein the first composition being different than the second composition.

2. The method of claim 1, wherein the plurality of rib structures comprises, at least, a first rib structure having the first composition and the second rib structure having the second composition.

3. The method of claim 2, wherein forming the plurality of rib members further comprises:
   positioning a prefabricated member over the inner surface, wherein the prefabricated member comprises the first composition;
   extruding the melted second composition via the CNC device over the inner surface such that at least a portion of the second composition contacts the prefabricated member; and,
   solidifying the second composition to define the first rib structure and the second rib structure, respectively.

4. The method of claim 3, further comprising:
   preheating the one or more fiber-reinforced outer skins to facilitate bonding of the grid structure thereon.

5. The method of claim 1, wherein both the first composition and the second composition comprises a matrix loaded with a constituent, with a variation of the loading concentration being a difference between the first composition and the second composition.

6. The method of claim 5, wherein the constituent comprises at least one of fibers, microspheres, particles, or a combination thereof.

7. The method of claim 1, wherein forming the plurality of rib members comprises:
   additively manufacturing a first layer of thermoplastic material directly onto the inner surface of the outer skin, wherein the first layer defines an opening; and
   positioning a prefabricated member into the opening of the first layer of thermoplastic material such that the prefabricated member is anchored within the opening.

* * * * *